(12) United States Patent
Takeuchi et al.

(10) Patent No.: US 9,114,824 B2
(45) Date of Patent: Aug. 25, 2015

(54) STEERING SYSTEM, STEERING CONTROL DEVICE AND STEERING CONTROL METHOD

(75) Inventors: Keisuke Takeuchi, Susono (JP); Yoji Kanehara, Nagoya (JP); Toshio Tanahashi, Susono (JP); Yoshimitsu Agata, Numazu (JP); Tomohide Kawasaki, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/130,601

(22) PCT Filed: Jul. 3, 2012

(86) PCT No.: PCT/IB2012/001305
§ 371 (c)(1),
(2), (4) Date: Jan. 2, 2014

(87) PCT Pub. No.: WO2013/005092
PCT Pub. Date: Jan. 10, 2013

(65) Prior Publication Data
US 2014/0129089 A1 May 8, 2014

(30) Foreign Application Priority Data

Jul. 5, 2011 (JP) ................................. 2011-149575

(51) Int. Cl.
*B62D 5/04* (2006.01)
(52) U.S. Cl.
CPC ............ *B62D 5/0457* (2013.01); *B62D 5/0466* (2013.01)
(58) Field of Classification Search
CPC .............. B62D 6/08; B62D 5/04; B62D 6/00; G06F 19/00

USPC ................................. 701/41; 180/446; 345/76
See application file for complete search history.

(56) References Cited

U.S. PATENT DOCUMENTS

2005/0061577 A1 3/2005 Shimizu et al.
2006/0069481 A1* 3/2006 Kubota et al. ................... 701/41
(Continued)

FOREIGN PATENT DOCUMENTS

DE 60 2004 012 360 T2 3/2009
JP 2005 056193 3/2005
(Continued)

OTHER PUBLICATIONS

International Search Report Issued Oct. 11, 2012 in PCT/IB12/001305 Filed Jul. 3, 2012.

*Primary Examiner* — Helal A Algahaim
*Assistant Examiner* — Michael Fouche
(74) *Attorney, Agent, or Firm* — Oblon, McClelland, Maier & Neustadt, L.L.P.

(57) ABSTRACT

A steering system includes: a steering member that is provided on a vehicle and that is used for a steering operation; an actuator that assists the steering operation of the steering member; and a steering control device that executes returning operation assist control in which the actuator is controlled to assist a returning operation for returning the steering member to a neutral position, the returning operation corresponding to a turning operation for turning the steering member from the neutral position, and that determines a returning operation time at the time of executing the returning operation assist control on the basis of a steering operation amount of the steering member at the time of the turning operation.

13 Claims, 19 Drawing Sheets

(56) References Cited

U.S. PATENT DOCUMENTS

2007/0265751 A1* 11/2007 Tsuchiya .................. 701/41
2009/0153370 A1   6/2009 Cooper et al.
2009/0271069 A1* 10/2009 Yamamoto et al. ......... 701/41
2010/0100359 A1   4/2010 Podoloff et al.

FOREIGN PATENT DOCUMENTS

| JP | 2005 145248 | 6/2005 |
| JP | 2007 099053 | 4/2007 |
| JP | 2011 051380 | 3/2011 |
| WO | 2013 011571 | 1/2013 |

* cited by examiner

STEERING SYSTEM, STEERING CONTROL DEVICE AND STEERING CONTROL METHOD

BACKGROUND OF THE INVENTION

1. Field of the Invention

The invention relates to a steering system, a steering control device and a steering control method.

2. Description of Related Art

For example, Japanese Patent Application Publication No. 2007-099053 (JP 2007-099053 A) describes a control device for an electric power steering system as an existing steering system or steering control device. The control device for an electric power steering system transmits steering assist force generated by a motor to a steering mechanism to reduce steering force. The control device for an electric power steering system includes a steering angle sensor that detects a steering angle of a steering shaft, a torque sensor that detects a steering torque applied to the steering shaft, a vehicle speed detecting unit that detects a vehicle speed, and a control unit that controls the motor on the basis of a steering angle, a steering angular speed, a steering torque and a vehicle speed.

Incidentally, in the above described control device for an electric power steering system, described in JP 2007-099053 A, the control unit has a steering wheel return control function, and corrects steering feeling on the basis of a steering angle through the steering wheel return control function. However, for example, further improvement in steering feeling is desired.

SUMMARY OF THE INVENTION

The invention provides a steering system, steering control device and steering control method that are able to improve steering feeling.

A first aspect of the invention relates to a steering system. The steering system includes: a steering member that is provided on a vehicle and that is used for a steering operation; an actuator that assists the steering operation of the steering member; and a steering control device that executes returning operation assist control in which the actuator is controlled to assist a returning operation for returning the steering member to a neutral position, the returning operation corresponding to a turning operation for turning the steering member from the neutral position, and that determines a returning operation time at the time of executing the returning operation assist, control on the basis of a steering operation amount of the steering member at the time of the turning operation.

In addition, in the above steering system, the steering control device may complete the returning operation to a target return position based on the neutral position of the steering member at an end point of the returning operation time in the returning operation assist control.

In addition, in the above steering system, the steering operation amount of the steering member at the time of the turning operation may be a steering operation amount of the steering member at an end point of the turning operation or a steering operation amount of the steering member at a stall point of the returning operation corresponding to the turning operation.

In addition, in the above steering system, when the returning operation is resumed after the returning operation is interrupted, the steering control device may determine the returning operation time on the basis of a steering operation amount of the steering member at a start point of the resumed returning operation.

In addition, in the above steering system, the steering control device may execute the returning operation assist control on the basis of the returning operation time and a returning operation speed based on the returning operation time, and the returning operation speed may have a speed pattern such that an absolute value of the returning operation speed increases with a lapse of the returning operation time and then reduces after passing a peak.

In addition, in the above steering system, the speed pattern of the returning operation speed for the returning operation time may satisfy at least one of following conditions that: i) a deviation between a local maximum value, other than a maximum value, of the absolute value of the returning operation speed and a local minimum value of the absolute value of the returning operation speed is smaller than or equal to a first predetermined value, ii) an operation amount based on the returning operation time and the returning operation speed from a start point of the returning operation time to an end point of the returning operation time is larger than or equal to a second predetermined value, iii) the operation amount falls within a predetermined range, iv) a deviation between the maximum value of the absolute value of the returning operation speed and an absolute value of the returning operation speed at the start point of the returning operation time or the end point of the returning operation time is larger than or equal to a third predetermined value, and v) a peak point at which the absolute value of the returning operation speed is the maximum value is located within a predetermined period that includes a median point between the start point of the returning operation time and the end point of the returning operation time.

In addition, in the above steering system, the steering control device may change the returning operation time on the basis of an allowable range of a target return position of the steering member in the returning operation assist control with respect to the neutral position of the steering member.

In addition, in the above steering system, the steering control device may change the returning operation time on the basis of a turning operation time of the turning operation.

In addition, in the above steering system, the steering control device may change the returning operation time on the basis of a vehicle speed of the vehicle.

In addition, in the above steering system, the steering control device may change the returning operation time on the basis of a running state of the vehicle.

A second aspect of the invention relates to a steering control device. The steering control device includes a control unit that executes returning operation assist control in which an actuator that assists a steering operation of a steering member provided on a vehicle and used for the steering operation is controlled to assist a returning, operation for returning the steering member to a neutral position, the returning operation corresponding to a turning operation for turning the steering member from the neutral position, and an operation time calculation unit determines a returning operation time at the time of executing the returning operation assist control on the basis of a steering operation amount of the steering member at the time of the turning operation.

A third aspect of the invention relates to a steering control method. The steering control method includes: executing returning operation assist control in which an actuator that assists a steering operation of a steering member provided on a vehicle and used for the steering operation is controlled to assist a returning operation for returning the steering member to a neutral position, the returning operation corresponding to a turning operation for turning the steering member from the neutral position, and determining a returning operation time at the time of executing the returning operation assist control on the basis of a steering operation amount of the steering member at the time of the turning operation.

The steering system, the steering control device and the steering control method according to the aspects of the invention are advantageously able to improve steering feeling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings. Note that the aspects of the invention are not limited to the embodiments. In addition, component elements described in the following embodiments include the ones that are easily replaceable by a person skilled in the art or substantially equivalent ones.

First Embodiment

Figure 1:
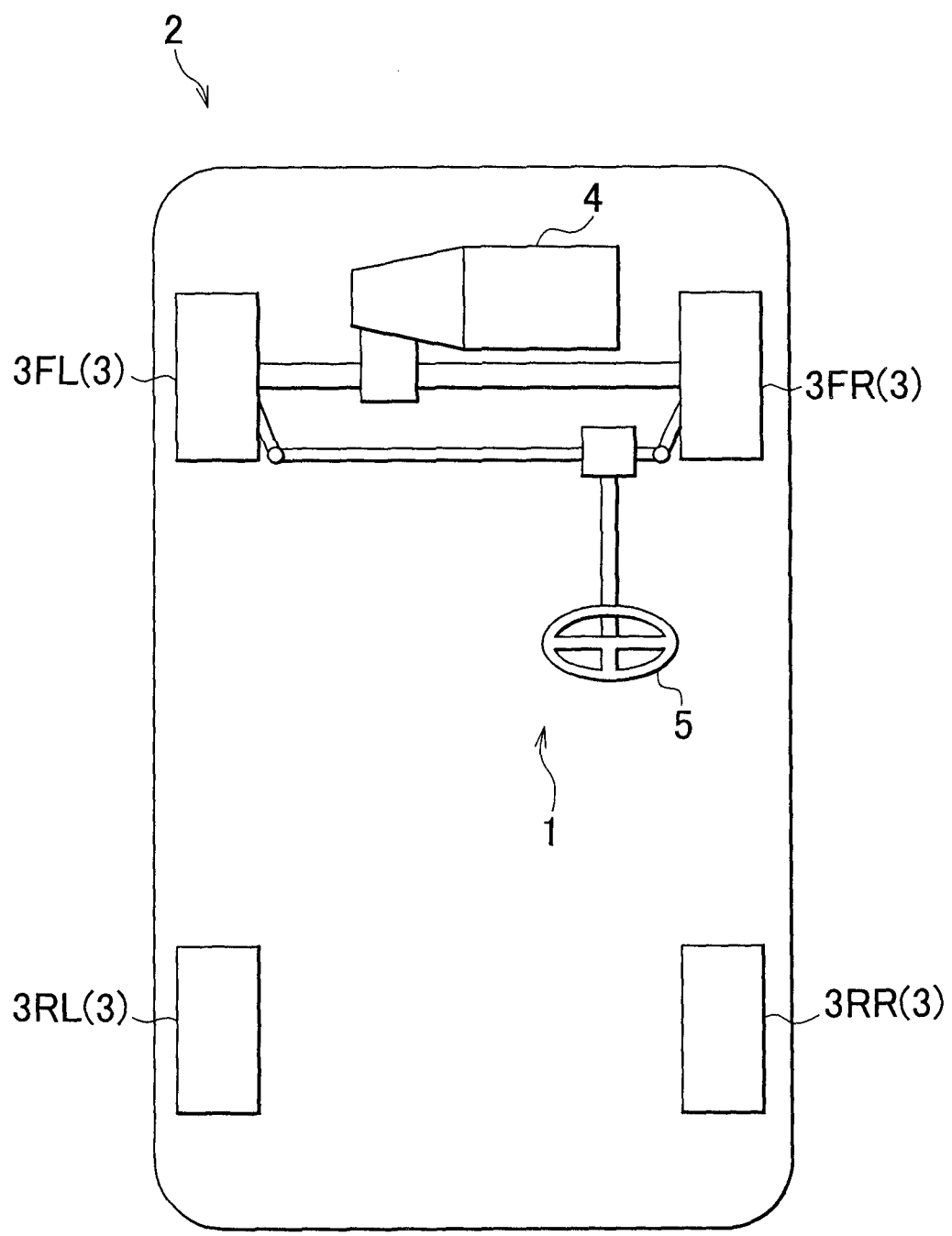
FIG. 1 is a schematic view of a vehicle on which a steering system according to a first embodiment is mounted.
Figure 2:
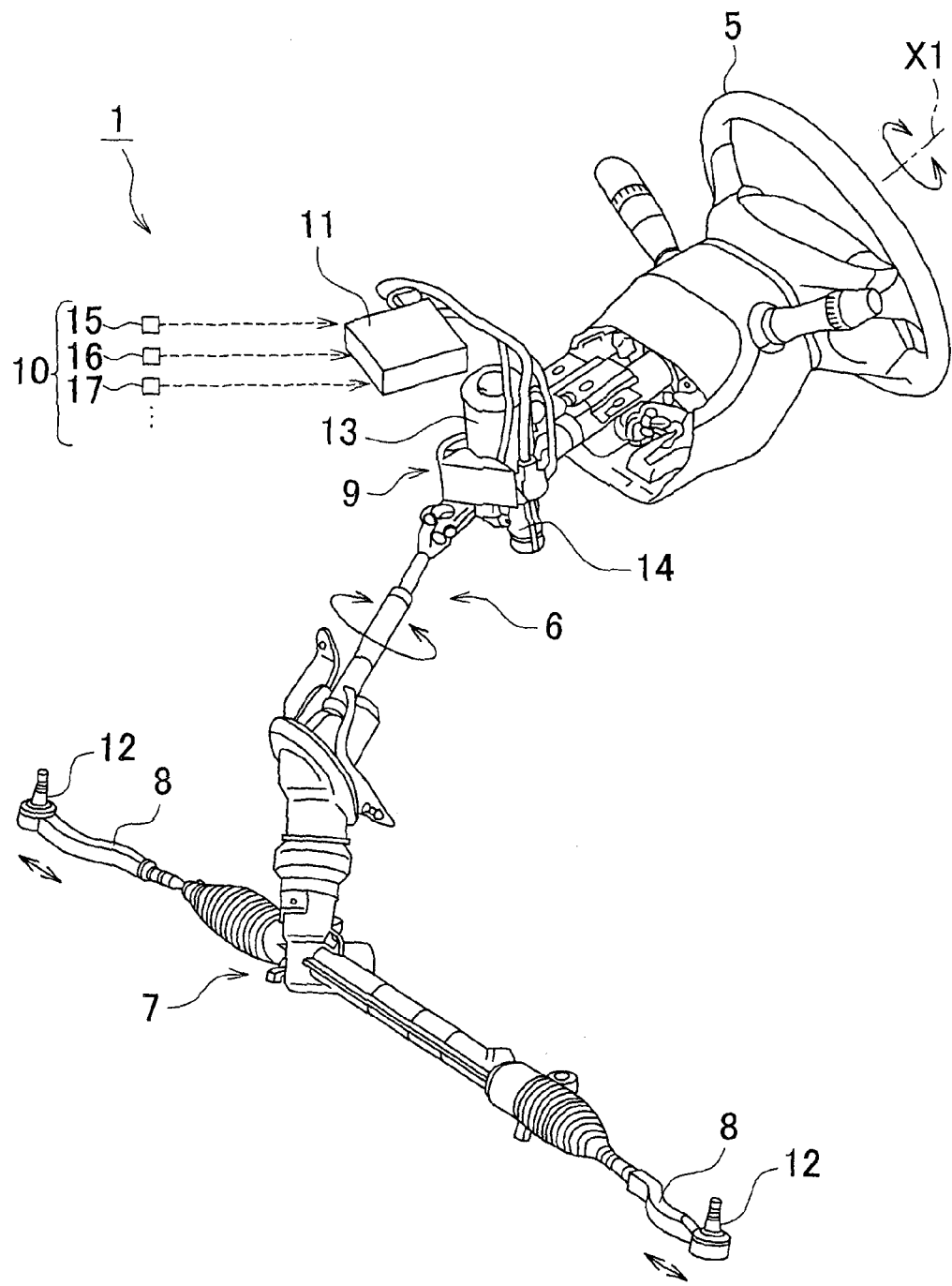
FIG. 2 is a schematic perspective view that shows the schematic configuration of the steering system according to the first embodiment.
Figure 3:
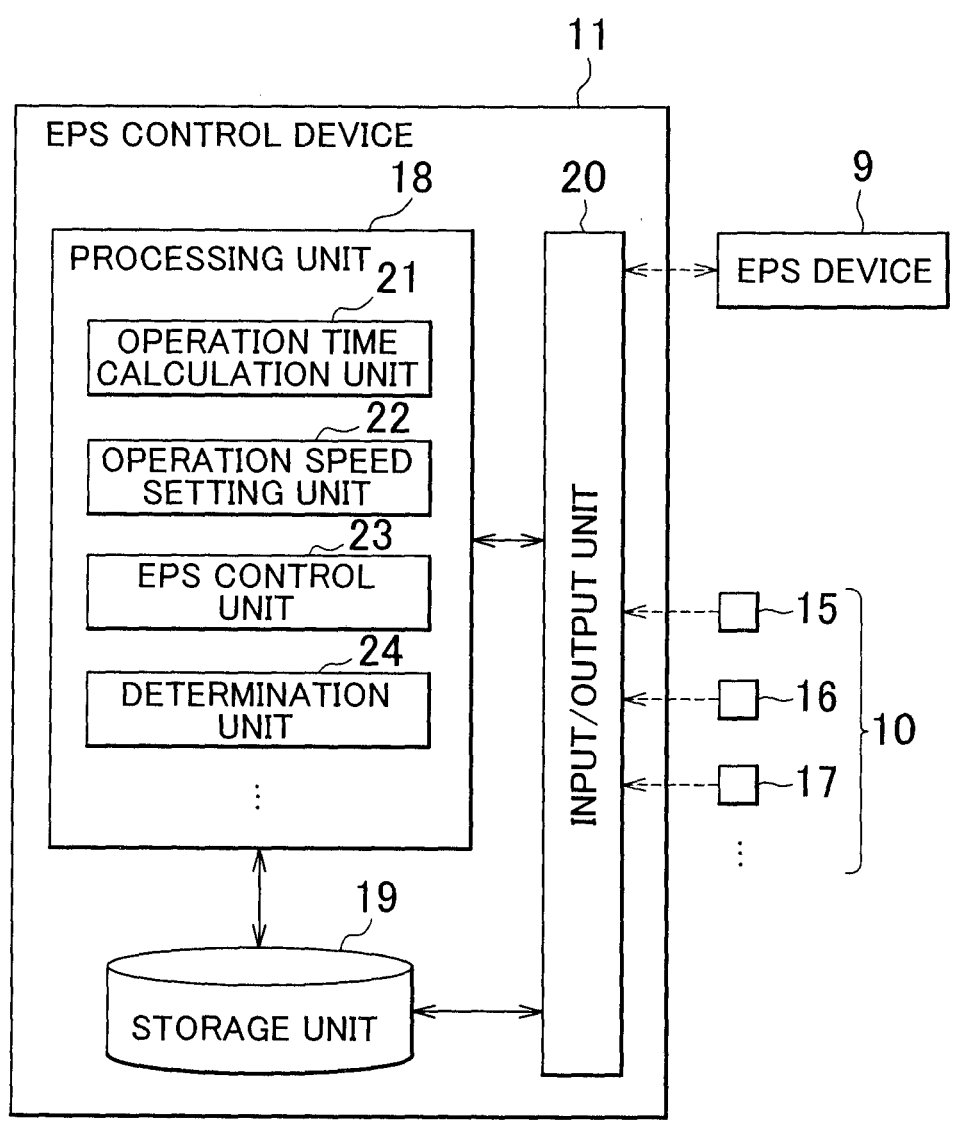
FIG. 3 is a schematic block diagram that shows the schematic configuration of an EPS control device according to the first embodiment.
Figure 4:
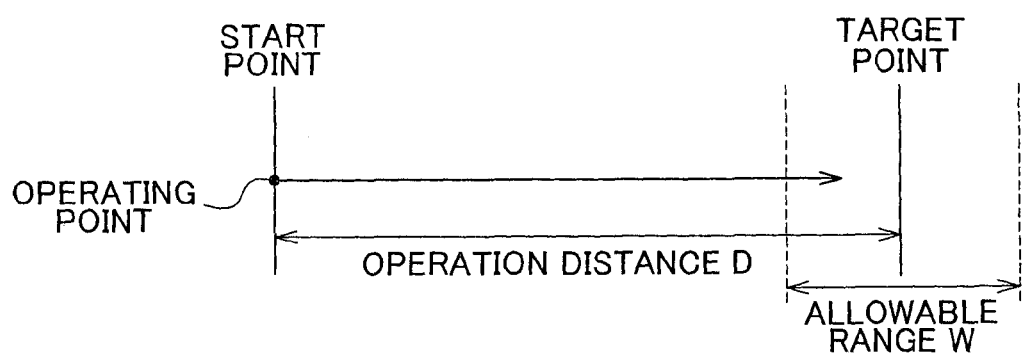
FIG. 4 is a schematic view that illustrates Fitts's Law in connection with a returning operation time.
Figure 5:
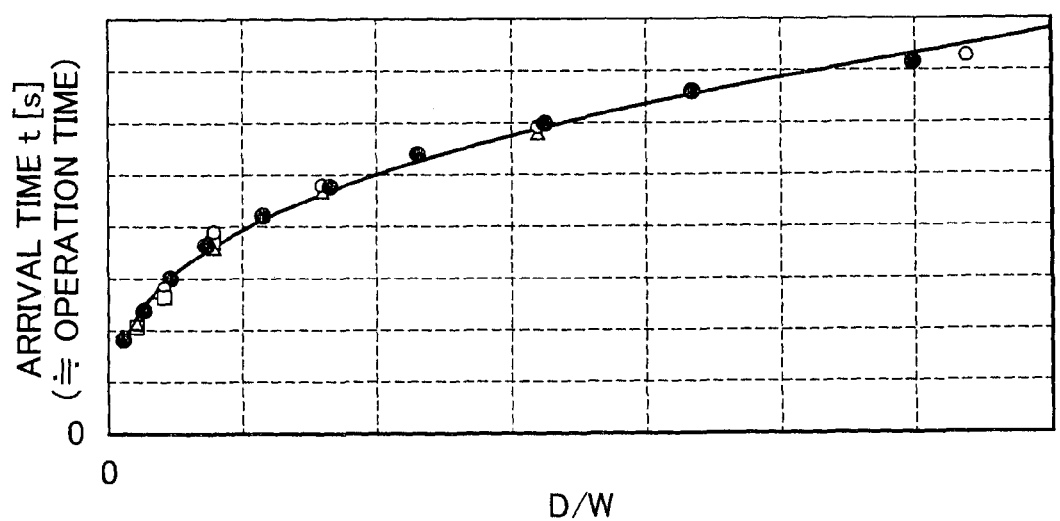
FIG. 5 is a graph that shows an example of the correlation among an arrival time, an operation distance and an allowable range in Fitts's Law in connection with a returning operation time according to the first embodiment.
Figure 6:
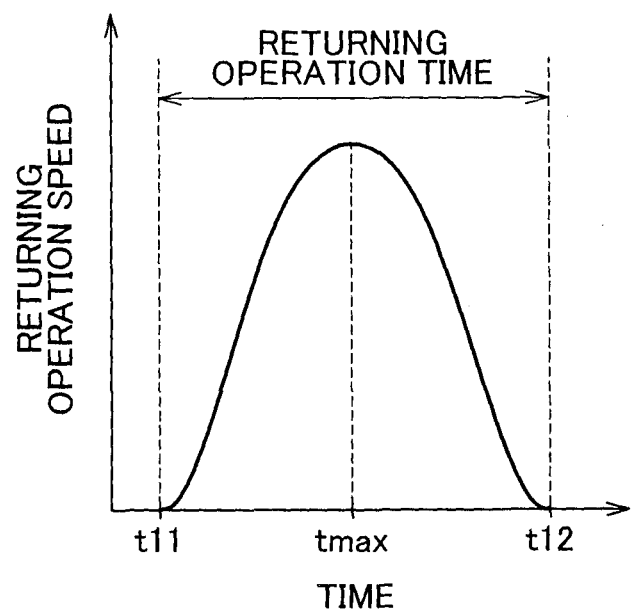
FIG. 6 is a graph that shows an example of the speed pattern of a bell-shaped curve in connection with a returning operation speed according to the first embodiment.
Figure 12:
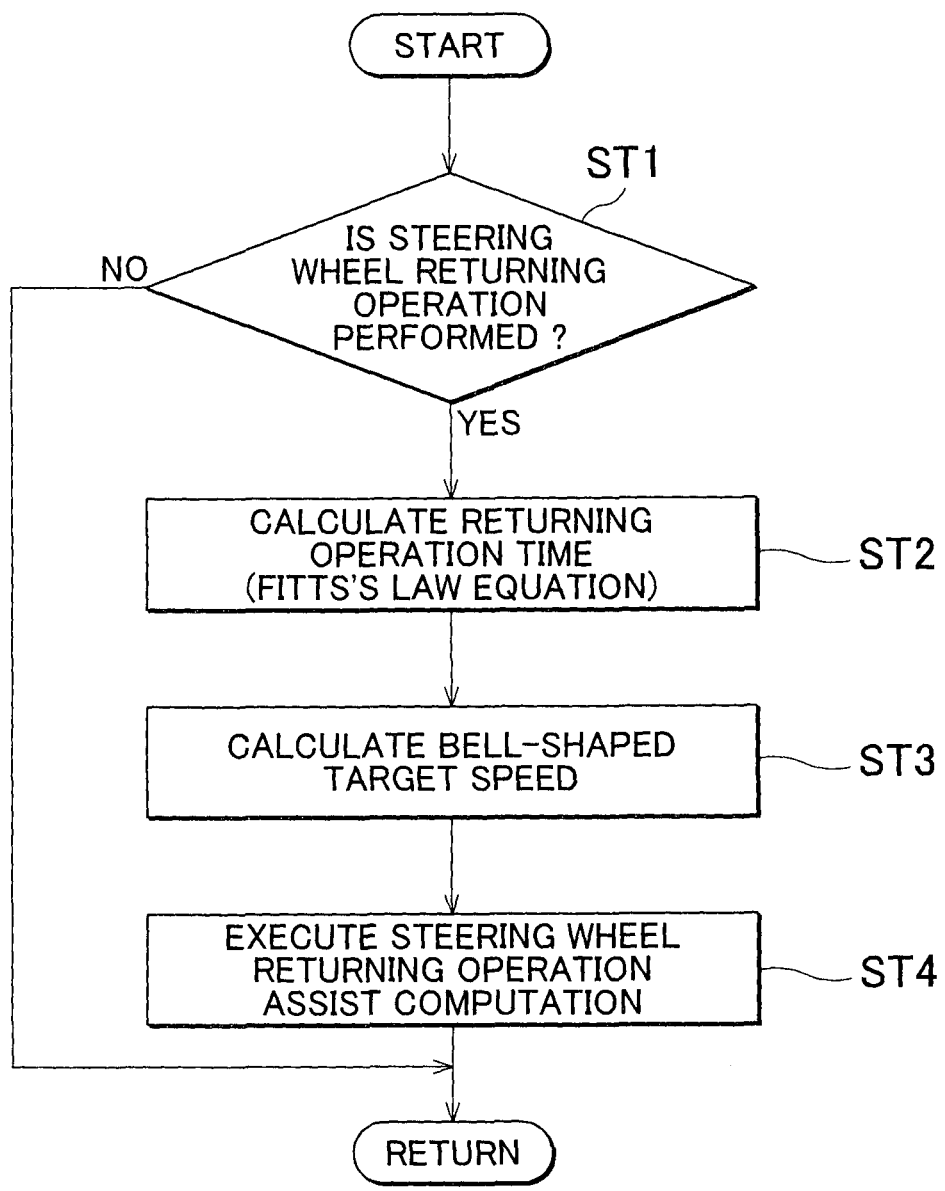
FIG. 12 is a flow chart that illustrates an example of control executed by the EPS control device according to the first embodiment.
Figure 13:
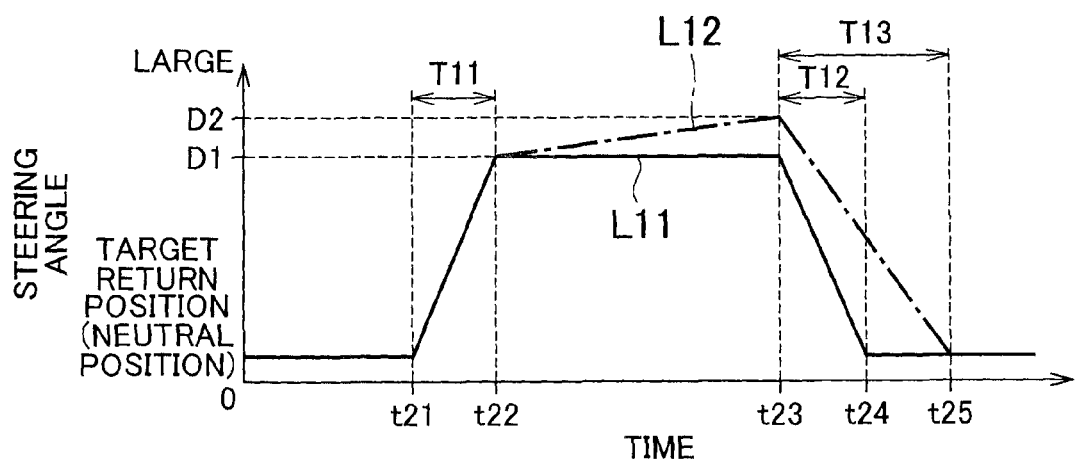
FIG. 13 is a time chart that illustrates the operations of the steering system according to the first embodiment.
Figure 14:
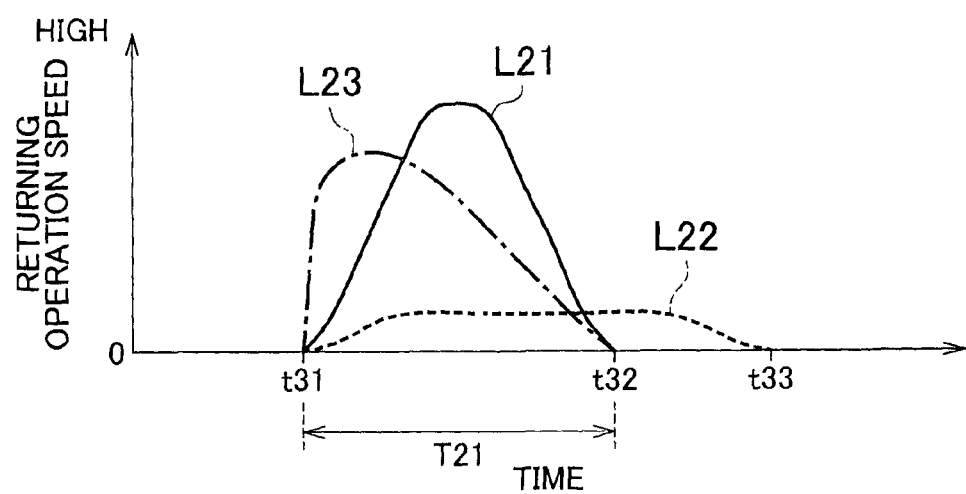
FIG. 14 is a time chart that illustrates the operations of the steering system according to the first embodiment.

FIG. 1 is a schematic view of a vehicle on which a steering system according to a first embodiment is mounted. FIG. 2 is a schematic perspective view that shows the schematic configuration of the steering system according to the first embodiment. FIG. 3 is a schematic block diagram that shows the schematic configuration of an EPS control device according to the first embodiment. FIG. 4 is a schematic view that illustrates Fitts's Law in connection with a returning operation time. FIG. 5 is a graph that shows an example of the correlation among an arrival time, an operation distance and an allowable range in Fitts's Law in connection with a returning operation time according to the first embodiment. FIG. 6 is a graph that shows an example of a bell-shaped curve speed pattern in connection with a returning operation speed according to the first embodiment. FIG. 7, FIG. 8, FIG. 9, FIG. 10 and FIG. 11 are schematic graphs that illustrate the conditions of a bell-shaped curve speed pattern in connection with a returning operation speed according to the first embodiment. FIG. 12 is a flow chart that illustrates an example of control executed by the EPS control device according to the first embodiment. FIG. 13 is a time chart that illustrates the operations of the steering system according to the first embodiment. FIG. 14 is a time chart that illustrates the operations of the steering system according to the first embodiment.

The present embodiment is applied to a vehicle, and is, for example, configured to execute so-called steering wheel returning operation assist control (returning operation assist control) using a bell-shape speed model in accordance with Fitts's Law. Then, in the present embodiment, by so doing, for example, a steering wheel returning operation time (returning operation time) and the speed locus of a steering wheel returning operation (the speed pattern of returning operation speed) match the operating characteristics (for example, operating rhythm) of a human to thereby allow a driver to naturally perform steering wheel returning operation by moving hands along a steering wheel (steering member). By so doing, steering feeling is improved.

Specifically, as shown in FIG. 1, a steering system 1 according to the present embodiment is mounted on a vehicle 2. The steering system 1 is used to turn the steered wheels of the vehicle 2. The vehicle 2 includes a front left wheel 3FL, a front right wheel 3FR, a rear left wheel 3RL and a rear right wheel 3RR as wheels 3. Power generated by a running drive source (motor), such as an internal combustion engine 4, is applied to the wheels 3 that are drive wheels (for example, the front left wheel 3FL and the front right wheel 3FR) to generate driving force [N] at the treads of the wheels 3 on a road surface. By so doing, the vehicle 2 is able to run. In addition, the driver rotates a steering wheel 5 that serves as a steering member to make it possible to turn the steered wheels 3 (for example, the front left wheel 3FL and the front right wheel 3FR). By so doing, the vehicle 2 is able to turn.

Note that the vehicle 2 is configured as a so-called front-wheel-drive vehicle in which power generated by the internal combustion engine 4 is transmitted to the front left wheel 3FL and the front right wheel 3FR and then driving force is generated at the front left wheel 3FL and the front right wheel 3FR; however, the vehicle 2 may be configured to have a drive system, other than a front-wheel drive system, such as a rear-wheel drive system and a four-wheel drive system. In the rear-wheel drive system, driving force is generated at the rear left wheel 3RL and the rear right wheel 3RR. In the four-wheel drive system, driving force is generated at all the wheels 3. In addition, the running drive source may be other than the internal combustion engine 4. For example, the running drive source may be an electric motor or both the internal combustion engine 4 and an electric motor.

Then, the steering system 1 according to the present embodiment is a so-called electric power steering system (EPS) that assists the steering force of the vehicle 2 with the power of an electric motor, or the like. The steering system 1 drives the electric motor, or the like, so as to be able to obtain steering assist force based on steering force applied from the driver to the steering wheel serving as the steering member to thereby assist the driver in steering the steering wheel 5.

As shown in FIG. 2, the steering system 1 according to the present embodiment includes the steering wheel 5, a steering shaft (hereinafter, simply referred to as "shaft" unless otherwise specified) 6, a rack-and-pinion mechanism (hereinafter, simply referred to as "gear mechanism" unless otherwise specified) 7, a pair of left and right tie rods 8, an EPS device 9 that serves as an actuator, a state detecting device 10 and an EPS control device 11 that serves as a steering control device.

The steering wheel 5 is rotatable in the direction around a rotation axis X1 and is provided at the driver seat of the vehicle 2. The driver rotates the steering wheel 5 about the rotation axis X1 to thereby make it possible to perform steering operation. The driver rotates the steering wheel 5 to thereby make it possible to turn the front left wheel 3FL and the front right wheel 3FR that serve as the steered wheels of the vehicle 2. That is, the vehicle 2 on which the steering system 1 is mounted is configured such that the steering wheel 5 is operated by the driver to turn the front left wheel 3FL and the front right wheel 3FR.

The shaft 6 serves as the rotary shaft portion of the steering wheel 5. One end of the shaft 6 is coupled to the steering wheel 5, and the other end of the shaft 6 is coupled to the gear mechanism 7. That is, the steering wheel 5 is connected to the gear mechanism 7 via the shaft 6. The shaft 6 is rotatable in the direction about the central axis thereof integrally with the steering wheel 5 as the driver rotates the steering wheel 5. Here, the shaft 6 is divided into a plurality of members, such as an upper shaft, an intermediate shaft and a lower shaft.

The gear mechanism 7 mechanically couples the shaft 6 to the pair of tie rods 8. The gear mechanism 7, for example, has a so-called rack-and-pinion gear mechanism. The gear mechanism 7 converts rotating motion in the direction around the central axis of the shaft 6 into linear motion in the transverse direction (typically, corresponding to the vehicle widthwise direction of the vehicle 2) of the pair of tie rods 8 owing to the action of the gear mechanism.

The proximal end portions of the pair of tie rods 8 each are coupled to the gear mechanism 7. Tie rod ends 12 that serve as distal end portions of the pair of tie rods 8 are respectively coupled to the steered wheels, that is, the front left wheel 3FL and the front right wheel 3FR, via knuckle arms (not shown). That is, the steering wheel 5 is coupled to the front left wheel 3FL and the front right wheel 3FR via the shaft 6, the gear mechanism 7, the tie rods 8, and the like.

The EPS device 9 is an actuator that assists the driver in steering the steering wheel 5. The EPS device 9 outputs steering assist force (assist torque) for assisting steering force (steering torque) input to the steering wheel 5 by the driver. In other words, the EPS device 9 drives the front left wheel 3FL and the front right wheel 3FR that serve as the steered wheels of the vehicle 2 with the use of the electric motor, or the like, to thereby support driver's steering operation. The EPS device 9 applies assist torque to the shaft 6 to assist driver's steering operation. Furthermore, the EPS device 9 is able to adjust torque applied to the shaft 6 on the basis of the steering angle of the steering wheel 5. Here, assist torque is used to assist steering torque corresponding to steering force input to the steering wheel 5 by the driver.

Here, the EPS device 9 includes a motor 13 and a reduction gear 14. The motor 13 serves as the electric motor. The EPS device 9 according to the present embodiment is, for example, a column EPS device in which the motor 13 is provided on the shaft 6, such as the intermediate shaft, that is, a so-called column assist-type assist mechanism.

The motor 13 is a column assist electric motor that is supplied with electric power to generate rotation power (motor torque). By so doing, steering assist force (assist torque) is generated. The motor 13 is connected to the shaft 6 via the reduction gear 14, and the like, such that power is transmittable, and applies steering assist force to the shaft 6 via the reduction gear 14, and the like. The reduction gear 14 transmits the rotation power of the motor 13 to the shaft 6 while reducing the speed.

In the EPS device 9, as the motor 13 is driven for rotation, rotation power generated by the motor 13 is transmitted to the shaft 6 via the reduction gear 14. By so doing, steering assist is performed. At this time, rotation power generated by the motor 13 is reduced in speed and increased in torque by the reduction gear 14, and is then transmitted to the shaft 6. The EPS device 9 is electrically connected to the EPS control device 11 (described later), and the motor 13 is controlled.

The state detecting device 10 detects the state of the vehicle 2 on which the steering system 1 is mounted, and is configured to include various sensors, and the like. The state detecting device 10 is electrically connected to the EPS control device 11, and is able to exchange information, such as a detection signal, a drive signal and a control command, with each other. The state detecting device 10, for example, includes a torque sensor 15, a steering angle sensor 16, a vehicle speed sensor 17, and the like. The torque sensor 15 detects a torque applied to the steering wheel 5. The steering angle sensor 16 detects a steering angle that is the rotation angle of the steering wheel 5. The vehicle speed sensor 17 detects a vehicle speed of the vehicle 2 on which the steering system 1 is mounted.

The EPS control device 11 controls the EPS device 9. The EPS control device 11 is an electronic circuit that is mainly formed of a known microcomputer that includes a CPU, a ROM, a RAM and an interface. Various sensors of the above described state detecting device 10 and the EPS device 9 are electrically connected to the EPS control device 11. Electric signals corresponding to detected results from the various sensors are input to the EPS control device 11. The EPS control device 11 outputs a drive signal to the EPS device 9 on the basis of the input detected results to control the EPS device 9. Note that the EPS control device 11 is, for example, configured to be electrically connected to an ECU that controls various portions of the vehicle 2 on which the steering system 1 is mounted and exchange information, such as a detected signal, a drive signal and a control command, via the ECU or may be configured integrally with the ECU.

The EPS control device 11, for example, controls the EPS device 9 on the basis of, for example, the torque detected by the torque sensor 15, and the EPS device 9 adjusts assist torque applied to the shaft 6. The EPS control device 11 adjusts assist current that is a supply current supplied to the motor 13 of the EPS device 9. By so doing, the output of the motor 13 is adjusted to adjust the assist torque. Here, the assist current is a supply current having a magnitude by which the EPS device 9 is able to generate a required predetermined assist torque.

The EPS control device 11 basically controls the motor 13 so that the EPS device 9 generates an assist torque based on a steering torque on the basis of the torque detected by the torque sensor 15 (assist control). At this time, in the steering system 1, the steering torque input to the steering wheel 5 from the driver and the assist torque generated by the EPS device 9 on the basis of the steering torque, or the like, through control executed by the EPS control device 11 both are applied to the shaft 6. Then, in the steering system 1, when steering force and steering assist force are applied from the shaft 6 to the tie rods 8 via the gear mechanism 7, the tie rods 8 are displaced in the transverse direction by axial force having a magnitude corresponding to the steering torque and the assist torque to turn the front left wheel 3FL and the front right wheel 3FR that serve as the steered wheels. In addition, at this time, the steering assist force (assist torque) applied from the EPS device 9 to the shaft 6 is also applied to the steering wheel 5 that integrally rotates with the shaft 6.

As a result, the above configured steering system 1 is able to turn the front left wheel 3FL and the front right wheel 3FR with the steering force input to the steering wheel 5 by the driver and the steering assist force generated by the EPS device 9. By so doing, it is possible to assist driver's steering operation, and it is possible to reduce a load on the driver at the time of the steering operation.

Then, furthermore, the EPS control device 11 according to the present embodiment controls the EPS device 9 to make it possible to execute steering wheel returning operation assist control (hereinafter, simply referred to as "steering wheel return control" unless otherwise specified) as returning operation assist control. The steering wheel return control is control for smoothly returning the steering wheel 5 toward a neutral position and is, more specifically, control for assisting a returning operation for returning the steering wheel 5 toward the neutral position.

Here, the neutral position of the steering wheel 5 is a position at which the steering angle of the steering wheel 5 is 0°. That is, the returning operation for returning the steering wheel 5 is a steering operation for rotating the steering wheel 5 to approach the neutral position, that is, a steering operation in a direction to return the steering angle, that is, the rotation angle of the steering wheel 5, toward 0°. The returning operation for returning the steering wheel 5 is typically performed in correspondence with a turning operation for turning the steering wheel 5 from the neutral position. The turning operation for turning the steering wheel 5 is a steering operation for rotating the steering wheel 5 to move away from the neutral position, that is, a steering operation for rotating the steering wheel 5 from the neutral position in any one of right and left directions. That is, the turning operation for turning the steering wheel 5 is a steering operation for changing the steering angle, that is, the rotation angle of the steering wheel 5, from 0° in any one of right and left directions. Typically, the returning operation for returning the steering wheel 5 is a steering operation for returning the steering wheel 5, located at a predetermined rotational position through a turning operation, toward the neutral position.

The EPS device 9 is able to adjust steering wheel returning torque in steering wheel return control such that the EPS control device 11 adjusts the supply current supplied to the motor 13 (assist current). The steering wheel returning torque is an assist torque that is applied to the shaft 6 and, by extension, the steering wheel 5, by the EPS device 9 in order to return the steering wheel 5 to the neutral position in steering wheel return control. The steering wheel returning torque is adjusted on the basis of a supply current supplied to the motor 13. That is, the steering wheel returning torque is an assist torque in a direction to return the steering wheel 5 toward the neutral position. For example, when the driver steers the steering wheel 5 in a rightward rotation direction with respect to the neutral position through a turning operation, the steering wheel returning torque is a torque for rotating the steering wheel 5 in a leftward rotation direction toward the neutral position.

For example, when the steering angle of the steering wheel 5 is other than near the neutral position and a returning operation is performed by the driver or when the steering angle of the steering wheel 5 is other than the neutral position and an operation of the steering wheel 5 is almost not performed by the driver (when the steering torque is near zero), the EPS control device 11 executes steering wheel return control. In the steering wheel return control, the EPS control device 11 supplies the motor 13 with a supply current based on a steering wheel returning torque having a magnitude and a direction required to smoothly return the steering wheel 5 to the neutral position, and causes the EPS device 9 to generate the steering wheel returning torque. By so doing, the EPS control device 11 is able to allow the driver to naturally perform returning operation for returning the steering wheel 5, so it is possible to improve steering feeling.

Then, the EPS control device 11 according to the present embodiment determines a returning operation time at the time of executing steering wheel return control on the basis of the steering angle of the steering wheel 5 at the time of a turning operation to thereby improve steering feeling. In other words, the EPS control device 11 executes steering wheel return control in which the EPS device 9 is controlled on the basis of the returning operation time based on the steering angle of the steering wheel 5 to assist a returning operation for returning the steering wheel 5 toward the neutral position. Furthermore, the EPS control device 11 executes steering wheel return control on the basis of a returning operation time and a returning operation speed based on the returning operation time.

Here, the returning operation time is a period of time (period) during which the EPS device 9 assists the driver in a returning operation for returning the steering wheel 5. The returning operation speed is an operation speed at which the EPS device 9 assists the returning operation for returning the steering wheel 5, and is a steering speed (angular speed) of the steering wheel 5, caused by the steering wheel returning torque generated by the EPS device 9. In addition, the steering angle of the steering wheel 5 corresponds to a steering operation amount of the steering wheel 5 and, typically, corresponds to a steering operation amount from the neutral position of the steering wheel 5 in driver's steering operation.

Here, the EPS control device 11 completes returning operation to a target return position based on the neutral position of the steering wheel 5 at the end point of the returning operation time in steering wheel return control. That is, the EPS control device 11 ends steering wheel return control at the end point of the returning operation time. The above target return position is set within a predetermined range including an allowable deviation from the neutral position of the steering wheel 5.

In addition, for example, when the driver interrupts a returning operation for returning the steering wheel 5 in the middle of the returning operation time, the EPS control device 11 allows the interruption. After that, when a returning operation is performed again, the EPS control device 11 executes steering wheel return control on the basis of the returning operation time based on the steering angle at that point in time. That is, when a returning operation is interrupted and then resumed, the EPS control device 11 changes the returning operation time on the basis of the steering angle at the start point of the resumed returning operation.

More specifically, as shown in FIG. 3, the EPS control device 11 is configured to include a processing unit 18, a storage unit 19 and an input/output unit 20. The processing unit 18 executes various processings. The storage unit 19 stores a computer program, and the like, that control various portions of the vehicle 2. Drive circuits (not shown) that drive various portions of the vehicle 2 and various sensors are connected to the input/output unit 20. The processing unit 18, the storage unit 19 and the input/output unit 20 are connected to one another, and are able to exchange signals with one another. Then, the EPS control device 11 functionally conceptually includes an operation time calculation unit 21, an operation speed setting unit 22, an EPS control unit 23 and a determination unit 24 in the processing unit 18.

The operation time calculation unit 21 calculates a returning operation time at the time when steering wheel return control is executed on the basis of the steering angle of the steering wheel 5. The operation time calculation unit 21 typically calculates a returning operation time on the basis of a steering angle at the time of a turning operation. The EPS control device 11 according to the present embodiment uses so-called Fitts's Law to set a returning operation time on the basis of a steering angle of the steering wheel 5 at the time of a turning operation.

Here, Fitts's Law is a law that models the operating characteristics of a human in a machine interface and is, typically, a law that, in operation of a human that moves an operating point to a target point, a period of time required for the operating point to reach the target point is determined on the basis of a distance to the target point and a size of the target point. For example, as shown in FIG. 4, Fitts's Law equation may be expressed by the mathematical expression (1) using the function among an operation distance D from a start point to a target point, an allowable range W of a deviation with respect to a final position and an arrival time t required for the operating point to reach the target point. Typically, the arrival time t corresponds to an average time taken to complete an operation, the operation distance D corresponds to a distance from the start point to the center (target point) of an object, and the allowable range W corresponds to the width of the object measured in the operation direction. FIG. 5 shows an example of the correlation between [arrival time t] and [operation distance D/allowable range W] determined by the Fitts's Law equation. As shown in FIG. 5, [arrival time t] extends with an increase in [operation distance D/allowable range W].

$$t \approx \log(D/W) \qquad (1)$$

When the above Fitts's Law is applied to steering wheel return control in the steering system 1 according to the present embodiment, in the mathematical expression (1) that expresses Fitts's Law equation, the returning operation time corresponds to the arrival time t, the steering angle that corresponds to the operation amount of the steering wheel 5 from the neutral position (target point) corresponds to the operation distance D, and the allowable range of the target return position of the steering wheel 5 with respect to the neutral position corresponds to the allowable range W.

The operation time calculation unit 21 uses the mathematical expression (1) that expresses Fitts's Law equation to calculate the returning operation time on the basis of the steering angle and the allowable range of the target return position with respect to the neutral position, and determines the calculated operation time as the returning operation time used in steering wheel return control. The allowable range of the target return position may be preset on the basis of an actual vehicle evaluation, or the like. The operation time calculation unit 21 typically calculates a returning operation time on the basis of a steering angle at the end point of the turning operation or a steering angle at the start point of a returning operation corresponding to the turning operation, as the steering angle at the time of the turning operation. By so doing, the operation time calculation unit 21 is able to change the returning operation time on the basis of the steering angle, more specifically, on the basis of the steering angle at the end point of the turning operation or the steering angle at the start point of the corresponding returning operation, as the steering angle at the time of the turning operation. In this case, the returning operation time relatively extends when the absolute value of the steering angle is relatively large, and relatively reduces when the absolute value of the steering angle is relatively small.

In addition, the operation time calculation unit 21 is able to appropriately change the allowable range of the target return position on the basis of control accuracy, steering feeling, and the like, required in steering wheel return control and then calculate the returning operation time. By so doing, the operation time calculation unit 21 is able to change the returning operation time on the basis of the allowable range of the target return position of the steering wheel 5 in steering wheel return control with respect to the neutral position. In this case, the returning operation time relatively reduces when the allowable range is relatively wide, and relatively extends when the allowable range is relatively narrow.

Thus, the operation time calculation unit 21 uses the mathematical expression (1) that expresses Fitts's Law equation as described above to calculate the returning operation time from the steering angle of the steering wheel 5 and the allowable range of the target return position. By so doing, the returning operation time in steering wheel return control may be set at a period of time that matches the operating characteristics of a human (for example, steering rhythm). That is, the operation time calculation unit 21 is able to set the returning operation time in steering wheel return control to a period of time that matches the operating characteristics of a human on the basis of the steering angle at the end point of a turning operation corresponding to a returning operation to be controlled or the steering angle at the start point of a returning operation to be controlled.

In addition, when a returning operation is interrupted and the returning operation is resumed, the operation time calculation unit 21 uses the mathematical expression (1) that expresses Fitts's Law equation to calculate the returning operation time on the basis of the steering angle at the start point of the resumed returning operation. As a result, the operation time calculation unit 21 is also able to set the returning operation time, used in steering wheel return control for the returning operation resumed after once interrupted, to a period of time that matches the operating characteristics of a human.

Subsequently, the operation speed setting unit 22 sets a returning operation speed on the basis of the returning operation time calculated by the operation time calculation unit 21. The operation speed setting unit 22 sets a returning operation speed on the basis of the returning operation time and the steering angle of the steering wheel 5. Typically, the operation speed setting unit 22 sets the returning operation speed so that a returning operation for returning the steering wheel 5 to the target return position based on the neutral position is completed at the end point of the returning operation time calculated by the operation time calculation unit 21. The operation speed setting unit 22, for example, sets the returning operation speed so that an integral value of the returning operation speed for the returning operation time is equivalent to the operation amount based on the steering angle at the end point of a turning operation or the steering angle at the start point of a returning operation. By so doing, the EPS control device 11 is able to complete the returning operation for returning the steering wheel 5 to the target return position based on the neutral position at the end point of the returning operation time.

Here, furthermore, the operation speed setting unit 22 desirably sets the returning operation speed in steering wheel return control to a speed pattern such that a returning operation is completed at the end point of the returning operation time and the absolute value of the returning operation speed increases with a lapse of the returning operation time and reduces after passing the peak. In other words, the operation speed setting unit 22 desirably sets the returning operation speed in steering wheel return control to a speed pattern such that the absolute value of the returning operation speed forms a convex shape with respect to the returning operation time. Furthermore, as shown in FIG. 6, the operation speed setting unit 22 further desirably sets the speed pattern of the returning operation speed to a so-called bell-shaped curve speed pattern (bell-shape speed model) in which the peak point tmax at which the absolute value of the returning operation speed is maximum is located at the center portion between the start point t11 and end point t12 of the returning operation time.

The bell-shaped curve speed pattern illustrated in FIG. 6 is typically a speed pattern based on a so-called minimum jerk model. The bell-shaped curve speed pattern corresponds to a speed locus of which the jerk that is the differential value of acceleration in motion, such as steering operation, is minimum, and to an optimal locus that theoretically shows smooth motion performed by a human. In the minimum jerk model, motion, such as steering operation, may be approximated as a speed locus of which an amount obtained by integrating the square of jerk from the start to end of the motion (evaluation function) is minimum. The speed locus obtained from the minimum jerk model is a speed locus such that a variation in force reduces as much as possible, and corresponds to smooth motion having a small variation in force as much as possible. The speed pattern (speed locus) obtained from this model is typically the above described bell-shaped curve speed pattern of which the speed is maximum at the median.

Specifically, the operation speed setting unit 22 desirably sets the speed pattern of the returning operation speed against the returning operation time to a bell-shaped curve speed pattern such that a returning operation is completed at the end point of the returning operation time and at least one of the following five conditions (A) to (E) is satisfied.

(A) The deviation between the local maximum value, other than the maximum value, of the absolute value of the returning operation speed and the local minimum value of the absolute value of the returning operation speed is smaller than or equal to a first predetermined value.

(B) The operation amount (operation displacement) based on the returning operation time and the returning operation speed from the start point and end point of the returning operation time is larger than or equal to a second predetermined value.

(C) The operation amount (operation displacement) falls within a predetermined range.

(D) The deviation between the maximum value of the absolute value of the returning operation speed and the absolute value of the returning operation speed at the start point or end point of the returning operation time is larger than or equal to a third predetermined value.

(E) The peak point at which the absolute value of the returning operation speed is maximum is located within a predetermined period that includes the median point between the start point and end point of the returning operation time.

Figure 7:
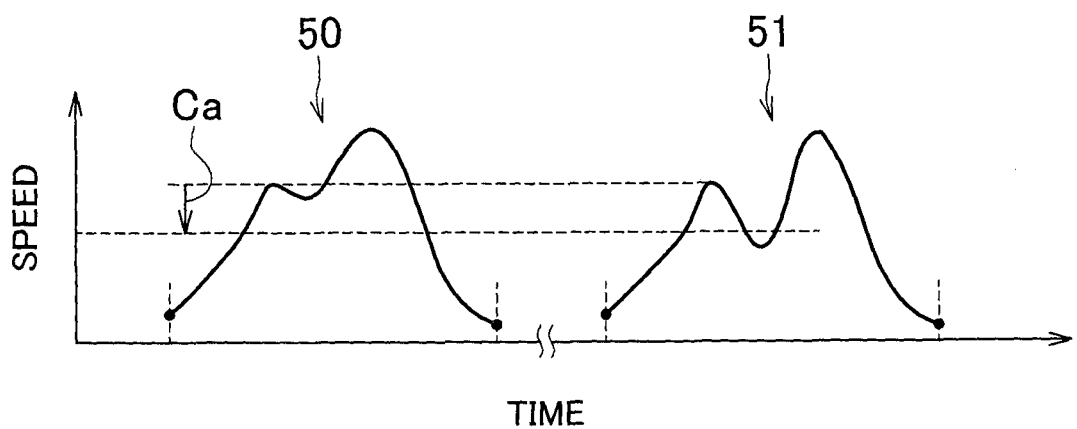
FIG. 7 is a schematic graph that illustrates the condition of a bell-shaped curve speed pattern in connection with a returning operation speed according to the first embodiment.

As is illustrated in FIG. 7, the speed pattern 50 that satisfies the condition (A) is typically a speed pattern that has no valley (bottom) exceeding a predetermined depth corresponding to the first predetermined value. In other words, the speed pattern 50 that satisfies the condition (A) is a speed pattern in which, when there are two local maximum values, there is no local minimum value (bottom) that is equal to or smaller than a predetermined ratio Ca corresponding to the first predetermined value with respect to the lower local maximum value. The first predetermined value or the predetermined ratio Ca may be set in advance such that the returning operation speed in steering wheel return control forms a smooth speed pattern on the basis of an actual vehicle evaluation, or the like. Note that the speed pattern 51 shown in FIG. 7 shows an example of a speed pattern that does not satisfy the condition (A) in which the deviation between the local maximum value, other than the maximum value, of the absolute value of the returning operation speed and the local minimum value of the absolute value of the returning operation speed is smaller than or equal to the first predetermined value.

Figure 8:
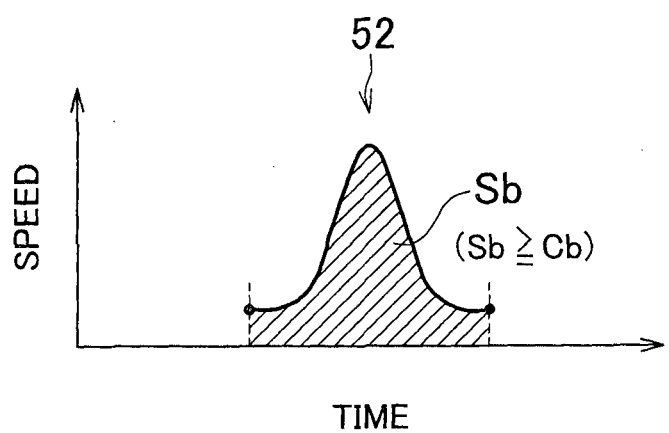
FIG. 8 is a schematic graph that illustrates the condition of a bell-shaped curve speed pattern in connection with a returning operation speed according to the first embodiment.

As is illustrated in FIG. 8, the speed pattern 52 that satisfies the condition (B) is typically a speed pattern such that the operation amount (operation displacement) based on the returning operation time and the returning operation speed from the start point to the end point of the returning operation time, that is, for example, the area Sb defined by the speed pattern waveform, is larger than or equal to a threshold Cb based on a second predetermined value. The second predetermined value or the threshold Cb may be preset such that the returning operation speed in steering wheel return control forms a smooth speed pattern on the basis of an actual vehicle evaluation, or the like.

Figure 9:
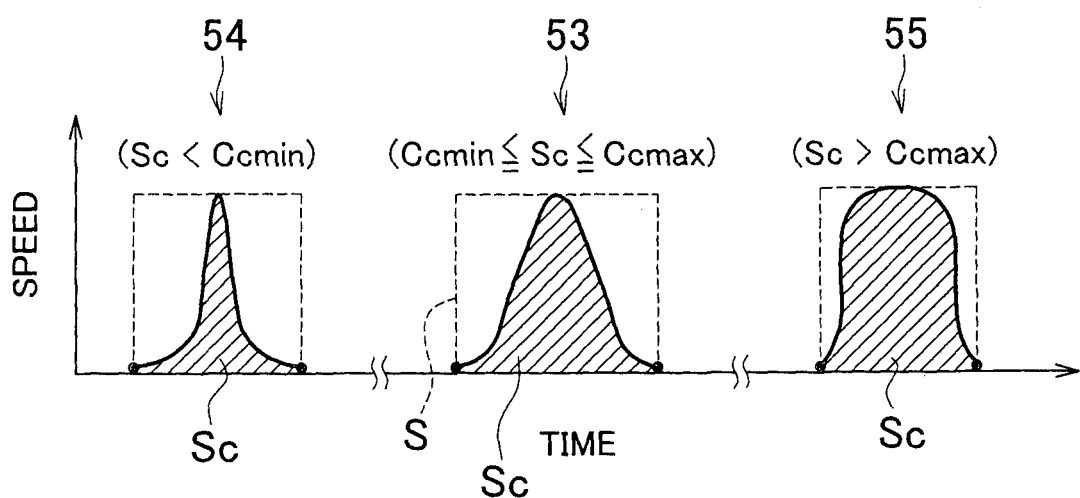
FIG. 9 is a schematic graph that illustrates the condition of a bell-shaped curve speed pattern in connection with a returning operation speed according to the first embodiment.

As is illustrated in FIG. 9, the speed pattern 53 that satisfies the condition (C) is typically a speed pattern such that the sharpness of the peak shape of the speed pattern waveform is a proper sharpness. The speed pattern 53 that satisfies the condition (C) is, for example, a speed pattern such that the area Sc of the speed pattern waveform corresponding to the operation amount (operation displacement) falls within the range from a lower limit value Ccmin to an upper limit value Ccmax, based on a predetermined range. In addition, furthermore, in other words, the speed pattern 53 that satisfies the condition (C) is a speed pattern such that the ratio of the area Sc, defined by the speed pattern waveform and corresponding to the operation amount (operation displacement), with respect to a quadrangle S formed to touch the start point and end point of the returning operation time and the maximum value of the absolute value of the returning operation speed falls within a predetermined ratio range based on the predetermined range. The predetermined range, lower limit value Ccmin, upper limit value Ccmax or predetermined ratio range, set for the operation amount (operation displacement) may be preset such that the returning operation speed in steering wheel return control forms a smooth speed pattern on the basis of an actual vehicle evaluation, or the like. Note that the speed pattern 54 shown in FIG. 9 shows an example of the speed pattern of which the area Sc is smaller than the lower limit value Ccmin and that does not satisfies the condition (C). In this case, the speed pattern tends to form a speed pattern waveform having an excessively sharp peak shape. In addition, the speed pattern 55 shown in FIG. 9 shows an example of the speed pattern of which the area Sc exceeds the upper limit value Ccmax and that does not satisfy the condition (C). In this case, the speed pattern tends to form a speed pattern waveform having an insufficiently sharp peak shape.

Figure 10:
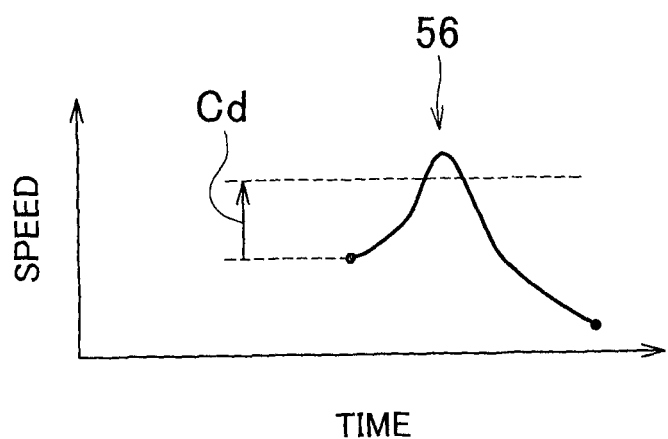
FIG. 10 is a schematic graph that illustrates the condition of a bell-shaped curve speed pattern in connection with a returning operation speed according to the first embodiment.

As is illustrated in FIG. 10, the speed pattern 56 that satisfies the condition (D) is a speed pattern such that the maximum value (peak) of the absolute value of the returning operation speed is sufficiently higher than the absolute value of the returning operation speed at the start point or end point of the returning operation time. The speed pattern 56 that satisfies the condition (D) is, for example, a speed pattern such that the ratio of the maximum value of the absolute value of the returning operation speed with respect to the larger one of the absolute value of the returning operation speed at the start point of the returning operation time and the absolute value of returning operation speed at the end point of the returning operation time is higher than or equal to a predetermined ratio Cd based on the third predetermined value. The third predetermined value or predetermined ratio Cd set for the difference may be preset such that the returning operation speed in steering wheel return control forms a smooth speed pattern on the basis of an actual vehicle evaluation, or the like.

Figure 11:
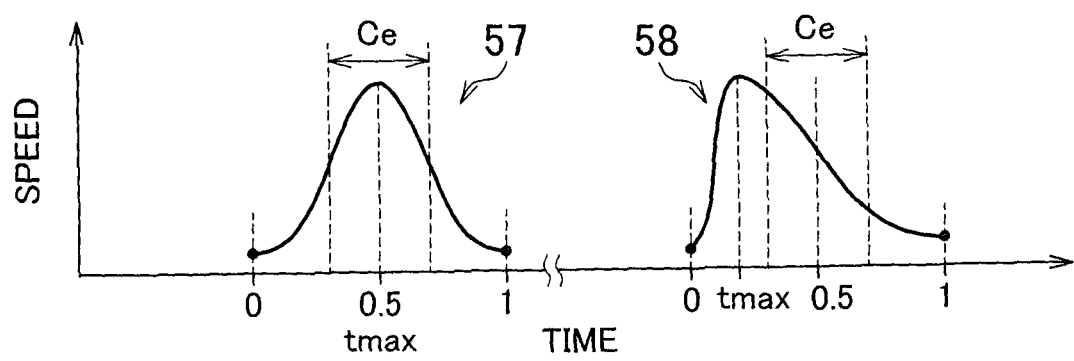
FIG. 11 is a schematic graph that illustrates the condition of a bell-shaped curve speed pattern in connection with a returning operation speed according to the first embodiment.

As is illustrated in FIG. 11, the speed pattern 57 that satisfies the condition (E) is a speed pattern such that the peak point at which the absolute value of the returning operation speed is maximum is present near the center between the start point and end point of the returning operation time. The speed pattern 57 that satisfies the condition (E) is, for example, a speed pattern such that, when the start point of the returning operation time is [0] and the end point of the returning operation time is [1], the peak point tmax is located within a predetermined period Ce having [0.5] set as a center. The predetermined period Ce may be preset such that the returning operation speed in steering wheel return control forms a smooth speed pattern on the basis of an actual vehicle evaluation, or the like. Note that the speed pattern 58 shown in FIG. 11 shows an example of the speed pattern in which the peak point tmax is located outside the predetermined period Ce.

The speed pattern of the returning operation speed is more desirably a pattern that satisfies multiple conditions among the five conditions (A) to (E). The operation speed setting unit 22 most desirably sets the speed pattern of the returning operation speed for the returning operation time to a pattern such that a returning operation is completed at the end point of the returning operation time and all the above five conditions (A) to (E) are satisfied. By so doing, the operation speed setting unit 22 is able to set the speed pattern of the returning operation speed to the above described appropriate bell-shaped curve speed pattern such that a returning operation is completed at the end point of the returning operation time.

Thus, the operation speed setting unit 22 sets the speed pattern (speed locus) of the returning operation speed to the bell-shaped curve speed pattern as described above to thereby make it possible to set the speed pattern of the returning operation speed in steering wheel return control to a speed pattern that matches the operating characteristics of a human. That is, the operation speed setting unit 22 is able to set the speed pattern of the returning operation speed in steering wheel return control to a speed pattern such that a returning operation is completed at the end point of the returning operation time on the basis of the returning operation time and, in addition, the steering wheel 5 may be smoothly returned to the neutral position along with the operating characteristics of a human.

Then, the EPS control unit (or control unit) 23 controls the EPS device 9 on the basis of the returning operation time calculated by the operation time calculation unit 21 and the returning operation speed set by the operation speed setting unit 22. The EPS control unit 23 calculates a target supply current supplied to the motor 13 (assist current) on the basis of the returning operation time calculated by the operation time calculation unit 21 and the returning operation speed set by the operation speed setting unit 22. The target supply current supplied to the motor 13 is set at a value at which the returning operation time and the returning operation speed calculated and set as described above may be achieved. Then, the EPS control unit 23 supplies current to the motor 13 on the basis of the calculated target supply current to execute steering wheel return control. By so doing, the EPS device 9 generates steering wheel returning torque such that a returning operation is completed at the end point of the returning operation time and the speed pattern of the returning operation speed during then forms a bell-shaped curve speed pattern.

The determination unit 24 makes various determinations in control executed in the steering system 1.

Next, an example of control executed by the EPS control device 11 will be described with reference to the flow chart shown in FIG. 12. Note that the control routine is repeatedly executed at control intervals of several hundreds of microseconds to several tens of milliseconds (hereinafter, the sane applies to the following description).

Initially, the determination unit 24 of the EPS control device 11 makes steering wheel returning operation determination on the basis of various results detected by the state detecting device 10, and determines whether a returning operation for returning the steering wheel 5 is performed by the driver (ST1). The determination unit 24 is able to determine whether a returning operation for returning the steering wheel 5 is performed by the driver on the basis of, for example, a steering torque T detected by the torque sensor 15 and a steering speed w corresponding to the differential value of a steering angle detected by the steering angle sensor 16.

Typically, when T×ω<0 (|ω|≥predetermined value) is satisfied, the determination unit 24 is allowed to determine that a returning operation for returning the steering wheel 5 is performed by the driver. Note that the determination unit 24 is not limited to this configuration; steering wheel returning operation determination may be made on the basis of a steering angle θ detected by the steering angle sensor 16. In this case, when the absolute value of the steering angle θ changes from an increasing state or constantly kept state to a reducing state (that is, the sign of the steering speed ω is inverted), the determination unit 24 is allowed to determine that a returning operation for returning the steering wheel 5 is performed by the driver.

When the determination unit 24 determines that a returning operation for returning the steering wheel 5 is not performed (No in ST1), the EPS control device 11 ends the current control cycle and proceeds to the next control cycle.

When the determination unit 24 determines that a returning operation for returning the steering wheel 5 is performed (Yes in ST1), the operation time calculation unit 21 of the EPS control device 11 calculates a returning operation time in steering wheel return control on the basis of the steering angle detected by the steering angle sensor 16 (ST2). The operation time calculation unit 21 uses the mathematical expression (1) that expresses Fitts's Law equation to calculate a returning operation time on the basis of the steering angle at the end point of a turning operation or the steering angle at the start point of a returning operation corresponding to the turning operation.

Subsequently, the operation speed setting unit 22 of the EPS control device 11 sets the speed pattern of the returning operation speed in steering wheel return control to a speed pattern in which a returning operation is completed at the end point of the returning operation time and that is a bell-shaped curve speed pattern on the basis of the returning operation time calculated by the operation time calculation unit 21 in ST2, and calculates the speed pattern as a bell-shaped target speed (ST3).

Then, the EPS control unit 23 of the EPS control device 11 calculates a target supply current supplied to the motor 13 (assist current) on the basis of the returning operation time calculated by the operation time calculation unit 21 in ST2 and the bell-shaped target speed calculated by the operation speed setting unit 22 in ST3 as steering wheel returning operation assist computation, and supplies current to the motor 13 on the basis of the calculated target supply current (ST4). Then, the EPS control unit 23 ends the current control cycle, and proceeds to the next control cycle.

Next, an example of the operations of the steering system 1 will be described with reference to the time charts shown in FIG. 13 and FIG. 14. Note that, in FIG. 13, the abscissa axis represents time, and the ordinate axis represents steering angle (operation amount from the neutral position). In FIG. 14, the abscissa axis represents time, and the ordinate axis represents returning operation speed.

For example, the solid line L11 in FIG. 13 illustrates the case where, after a turning operation for turning the steering wheel 5 is performed by the driver during the turning operation time T11 from time t21 to time t22, the steering angle is kept constant and, after that, a returning operation for returning the steering wheel 5 is started at time t23. In this case, in the above configured steering system 1, the EPS control device 11 (operation time calculation unit 21) uses the mathematical expression (1) that expresses Fitts's Law equation as described above to calculate a returning operation time T12 in steering wheel return control on the basis of a steering angle D1 at the end point t22 of the turning operation or the steering angle D1 at the start point t23 of the returning operation. The returning operation time T12 in steering wheel return control in this case is a period from time t23 to time t24.

On the other hand, for example, the alternate long and short dash line L12 in FIG. 13 illustrates the case where, after a turning operation for turning the steering wheel 5 is performed by the driver during the turning operation time T11 from time t21 to time t22, a further turning operation is performed up to time t23 and, after that, a returning operation for returning the steering wheel 5 is started at time t23. In this case, in the above configured steering system 1, the EPS control device 11 (operation time calculation unit 21) uses the mathematical expression (1) that expresses Fitts's Law equation as described above to calculate a returning operation time T13 in steering wheel return control on the basis of a steering angle D2 at t23 that is the end point of the turning operation and also the start point of the returning operation. The returning operation time T13 in steering wheel return control in this case is a period from time t23 to time t25, and is a period that is longer than the returning operation time T12.

As a result, the steering system 1 according to the present embodiment is able to appropriately change and determine the returning operation time at the time of executing steering wheel return control to a period of time that matches the operating characteristics of a human on the basis of the steering angle of the steering wheel 5. Then, in the steering system 1, the EPS control device 11 completes the returning operation for returning the steering wheel 5 to the target return position based on the neutral position at the end point of the returning operation time on the basis of the returning operation time changed on the basis of the steering angle of the steering wheel 5.

Thus, as is illustrated by the solid line L21 in FIG. 14, the steering system 1 is, for example, able to execute steering wheel return control during the returning operation time T21 from time t31, at which the returning operation time is changed along with the operating characteristics of a human on the basis of the steering angle of the steering wheel 5, to time t32. Thus, for example, in comparison with the case where the returning operation time is not set on the basis of the steering angle of the steering wheel 5 and steering wheel return control is executed at a simply fixedly set returning operation speed as is illustrated by the dotted line L22 in FIG. 14, the steering system 1 is able to prevent unnatural extension of steering wheel return control (steering wheel return control is executed up to time t33 in the dotted line L22) or unnatural shortening of steering wheel return control conversely with respect to driver's feeling. By so doing, it is possible to improve steering feeling.

Then, at this time, in the steering system 1, as is illustrated by the solid line L21 in FIG. 14, the EPS control device 11 (operation speed setting unit 22) sets the speed pattern of the returning operation speed for the returning operation time T21 to a speed pattern in which a returning operation is completed at the end point of the returning operation time and that is a bell-shaped curve speed pattern. By so doing, the steering system 1 is able to execute steering wheel return control in the speed pattern in which a returning operation is completed at the end point of the returning operation time and the steering wheel 5 may be smoothly returned to the neutral position along with the operating characteristics of a human. Thus, for example, as is illustrated by the alternate long and short dash line L23 in FIG. 14, the steering system 1 is able to suppress an unnaturally excessively steep returning operation speed or excessively slow returning operation speed in returning operation with respect to driver's feeling. By so doing, it is possible to further improve steering feeling.

That is, the above steering system 1 is able to assist the driver in the returning operation for returning the steering wheel 5 with the returning operation time and the returning operation speed that match the operating characteristics of a human, and is able to set steering feeling based on the steering angle at the time of the turning operation. More specifically, the steering system 1 according to the present embodiment is able to execute steering wheel return control with a bell-shaped speed model that conforms to Fitts's Law, so it is possible to improve steering feeling.

In addition, in the steering system 1, when a returning operation is interrupted and then the returning operation is resumed, the EPS control device 11 (operation time calculation unit 21) uses the mathematical expression (1) that expresses Fitts's Law equation to calculate a returning operation time on the basis of the steering angle at the start point of the resumed returning operation. Thus, the steering system 1 is able to assist the driver in the returning operation for returning the steering wheel 5 with the returning operation time and the returning operation speed that match the operating characteristics of a human for the returning operation resumed after once interrupted as well, so it is possible to improve steering feeling.

The steering system 1 according to the above described embodiment includes the steering wheel 5, the EPS device 9 and the EPS control device 11. The steering wheel 5 is provided on the vehicle 2 and may be steered. The EPS device 9 assists steering operation for steering the steering wheel 5. The EPS control device 11 controls the EPS device 9. The EPS control device 11 is able to execute steering wheel return control (returning operation assist control) for assisting a returning operation for returning the steering wheel 5 toward the neutral position, corresponding to a turning operation for turning the steering wheel 5 from the neutral position. The EPS control device 11 determines a returning operation time at the time of executing the steering wheel return control on the basis of the steering angle of the steering wheel 5 at the time of the turning operation. Thus, the steering system 1 and the EPS control device 11 are able to execute steering wheel return control that matches the operating characteristics of a human on the basis of the steering angle at the time of the turning operation. Therefore, it is possible to assist the driver in the returning operation for returning the steering wheel 5 along with the operating characteristics (steering rhythm) of a human. By so doing, it is possible to improve steering feeling.

Second Embodiment

Figure 15:
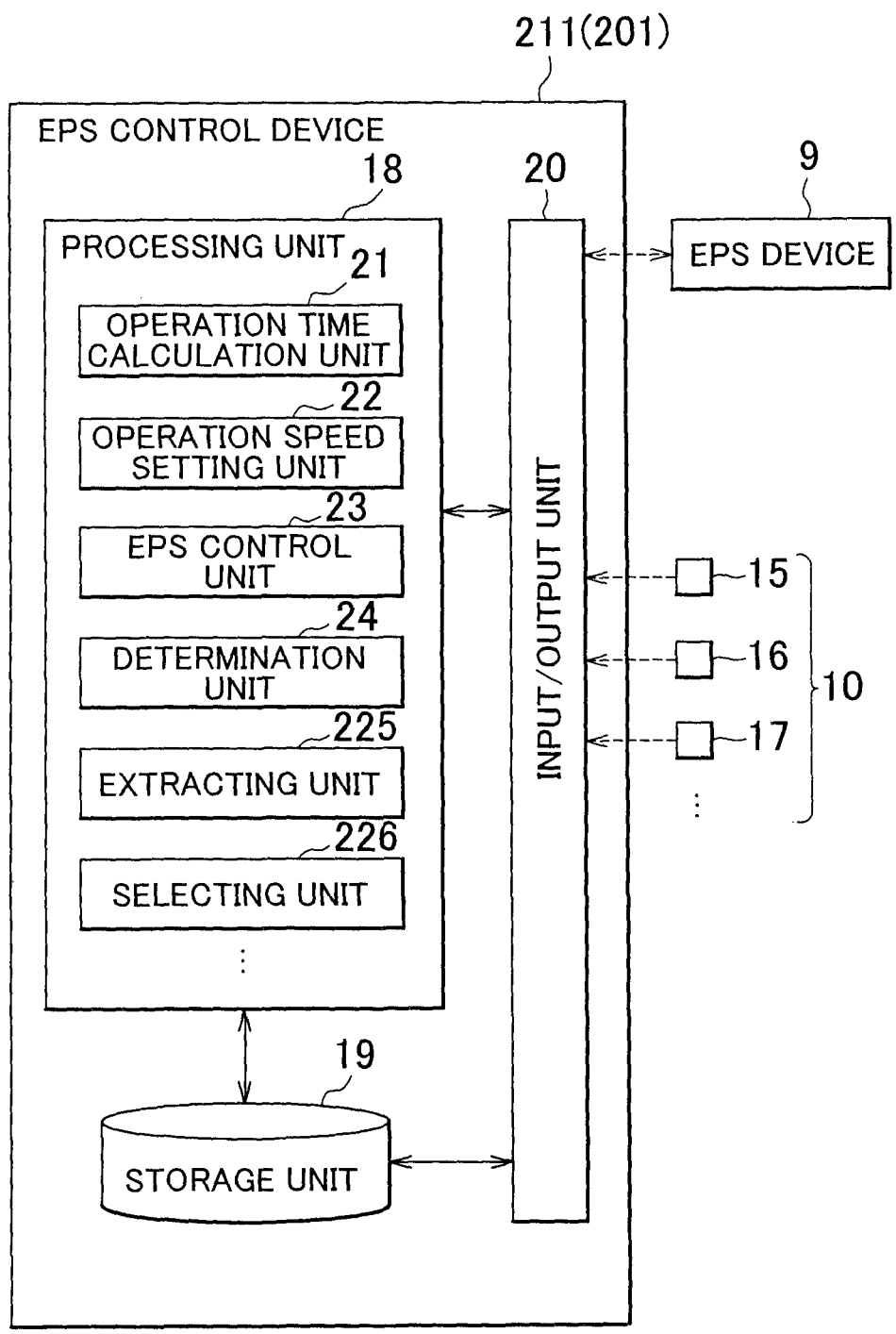
FIG. 15 is a schematic block diagram that shows the schematic configuration of an EPS control device according to a second embodiment.
Figure 16:
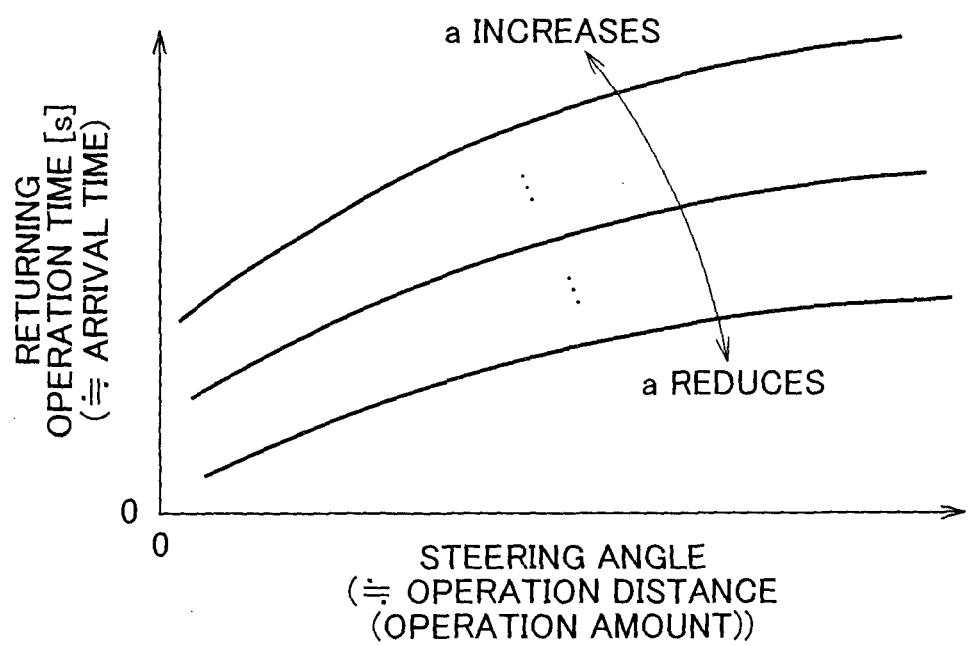
FIG. 16 is a graph that shows an example of the correlation among a returning operation time, a steering angle and a driving state coefficient in Fitts's Law related equation in connection with a returning operation time according to the second embodiment.
Figure 17:
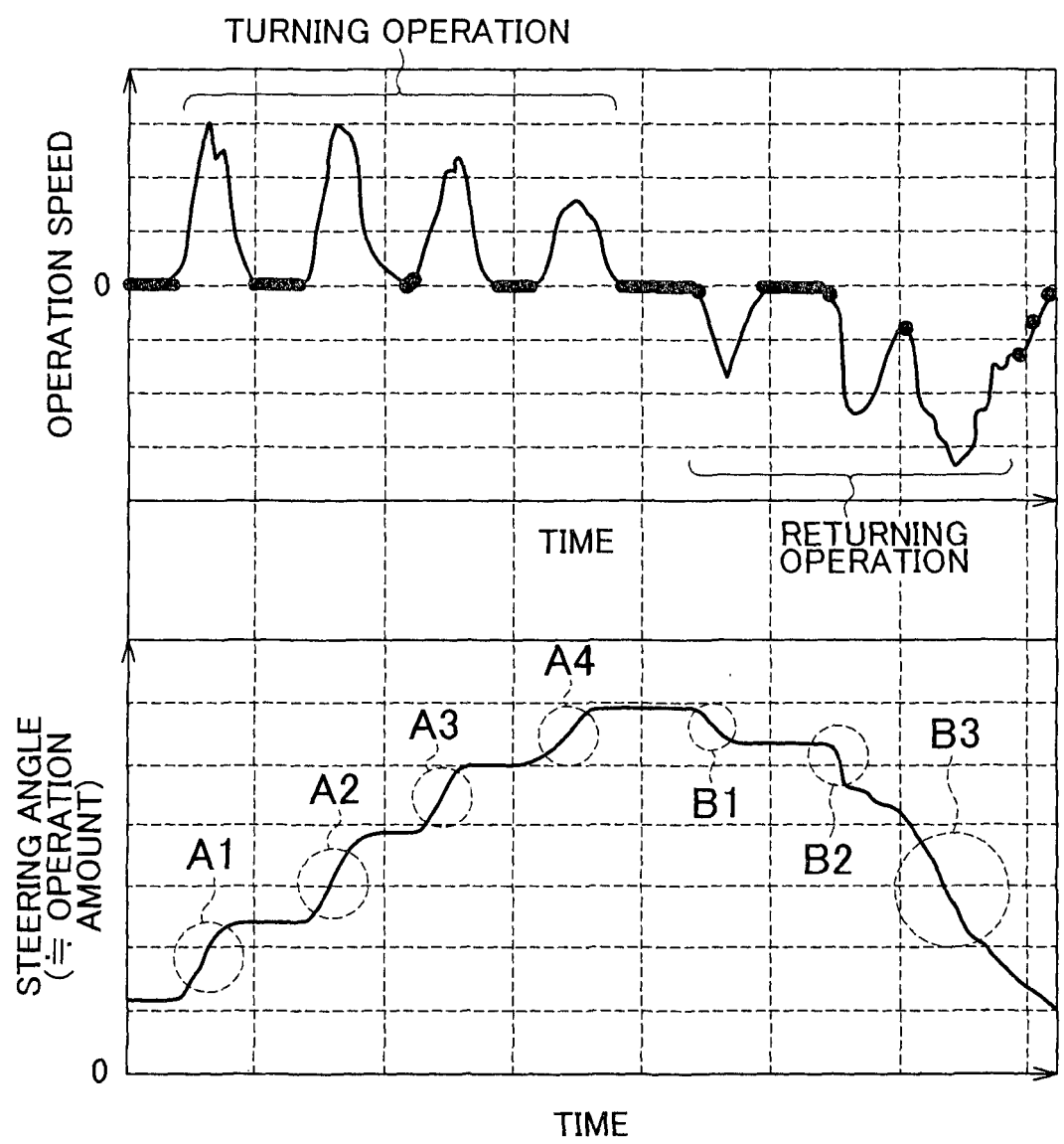
FIG. 17 is a graph that shows an example of unit behaviors extracted by an extracting unit according to the second embodiment.
Figure 18:
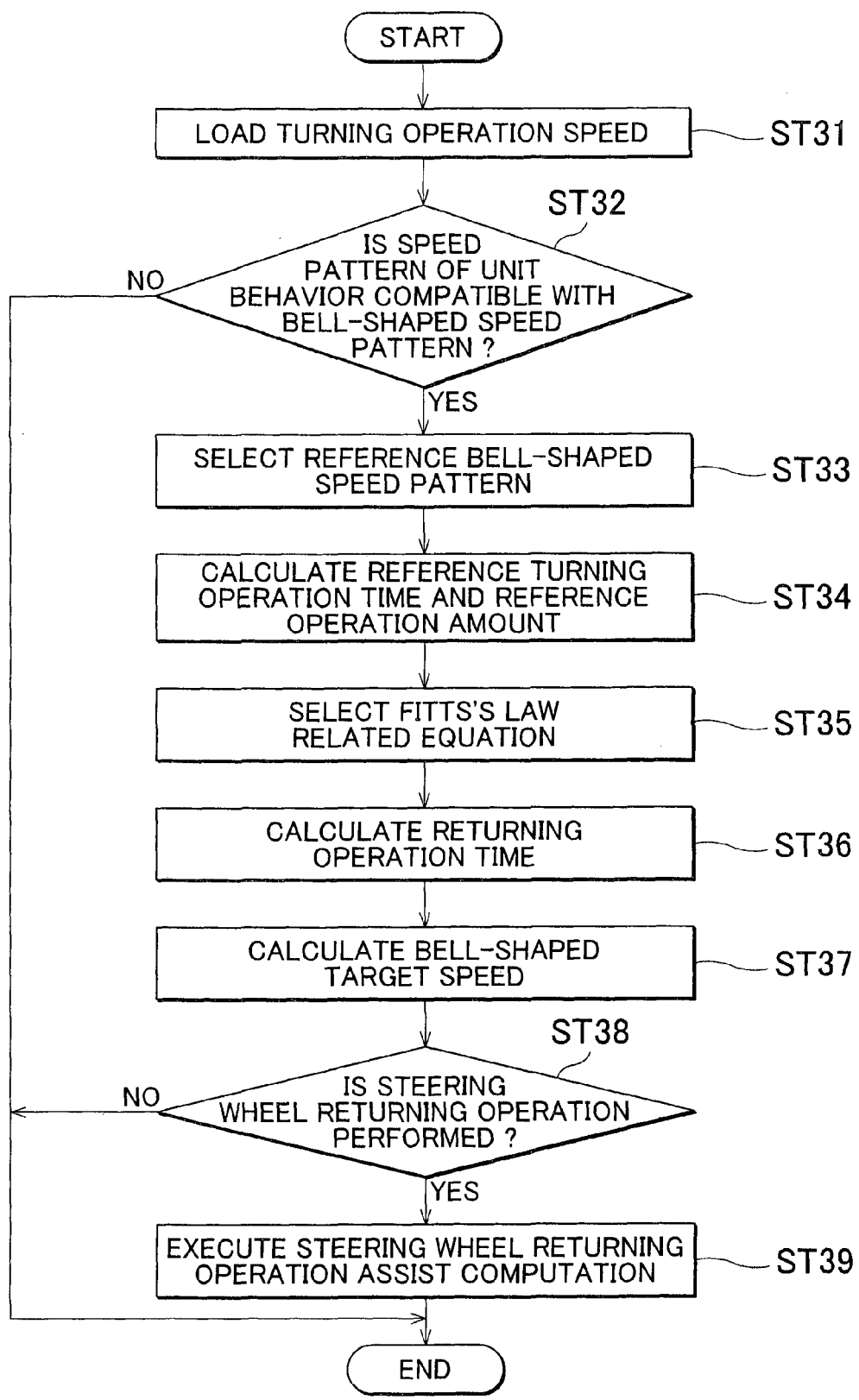
FIG. 18 is a flow chart that illustrates an example of control executed by the EPS control device according to the second embodiment.

FIG. 15 is a schematic block diagram that shows the schematic configuration of an EPS control device according to a second embodiment. FIG. 16 is a graph that shows an example of the correlation among a returning operation time, a steering angle and a driving state coefficient in Fitts's Law related equation in connection with a returning operation time according to the second embodiment. FIG. 17 is a graph that shows an example of unit behaviors extracted by an extracting unit according to the second embodiment. FIG. 18 is a flow chart that illustrates an example of control executed by the EPS control device according to the second embodiment. The steering system and the steering control device according to the second embodiment differ from those of the first embodiment in that a returning operation time is changed on the basis of a turning operation time of a turning operation. Other than that, like reference numerals denote the same components, operations and advantageous effects as those of the above described embodiment and the overlap description is omitted as much as possible (the same applies to embodiments described later).

A steering system 201 according to the present embodiment shown in FIG. 15 includes an EPS control device 211 as a steering control device. The EPS control device 211 according to the present embodiment changes a returning operation time in steering wheel return control on the basis of a turning operation time of a corresponding turning operation.

Here, the above described Fitts's Law equation tends to vary on the basis of a driver's driving state. An operation time (arrival time) for a constant operation amount (operation distance) tends to be relatively short, for example, when the driver quickly performs operation. On the other hand, an operation time for a constant operation amount tends to be relatively long when the driver slowly performs operation. Then, in Fitts's Law, when the driver's driving state is substantially equivalent, the correlation between an operation amount and an operation time tends to be determined by a specific Fitts's Law related equation based on substantially the driver's driving state.

The Fitts's Law related equation may be expressed by the mathematical expression (2) using, for example, the function among an arrival time t required to move an operation point to a target point, an operation distance D from a start point to the target point and a driving state coefficient a based on a driver's driving state. In the mathematical expression (2), "X" is a compatible value determined on the basis of an actual vehicle evaluation, or the like. In addition, the driving state coefficient a relatively reduces when the driver's driving state is in a state of performing relatively quick operation, and relatively increases when the driver's driving state is in a state of performing relatively slow operation.

$$t \approx a \cdot D^X \tag{2}$$

When the above Fitts's Law related equation is applied to steering wheel return control in the steering system 201, as in the case where the Fitts's Law equation is applied, the returning operation time corresponds to the arrival time t, and the steering angle corresponding to the operation amount of the steering wheel 5 from the neutral position (target point) corresponds to the operation distance D.

FIG. 16 shows an example of the correlation among [returning operation time arrival time)], [steering angle≈operation distance (operation amount from the neutral position)] and [driving state coefficient a], determined by the Fitts's Law related equation that is the mathematical expression (2). As shown in FIG. 16, [returning operation time] extends with an increase in [steering angle], and extends with an increase in [driving state coefficient a]. Thus, the returning operation time becomes short when the driver's driving state is in a state of performing relatively quick operation, and becomes relatively long when the driver's driving state is in a state of performing relatively slow operation.

The EPS control device 211 selects a Fitts's Law related equation on the basis of the driver's driving state at the time of executing steering wheel return control, and calculates a returning operation time from the steering angle on the basis of the selected Fitts's Law related equation. Then, here, the EPS control device 211 selects the Fitts's Law related equation used to calculate the returning operation time on the basis of the driver's driving state based on a driver's turning operation corresponding to a returning operation to be controlled in steering wheel return control at the time of executing the steering wheel return control. Note that the above Fitts's Law related equation is, for example, prestored in the storage unit 19 in a mathematical model as shown in the mathematical expression (2) or a map form as shown in FIG. 16.

Specifically, in the EPS control device 211, the processing unit 18 functionally conceptually further includes an extracting unit 225 and a selecting unit 226 in addition to the operation time calculation unit 21. The operation speed setting unit 22, the EPS control unit 23 and the determination unit 24.

The extracting unit 225 extracts the one compatible with the above bell-shaped curve speed pattern from the speed pattern of the turning operation speed during a turning operation prior to a returning operation. The bell-shaped curve speed pattern corresponds to a speed pattern in the case where one operation is finished at a constant rhythm. Conversely, the speed pattern of the operation speed normally becomes a bell-shaped curve speed pattern in the case where the driver performs operation at a constant operation rhythm, that is, in a constant operating state; whereas the speed pattern of the operation speed falls outside a bell shape and tends to become a non-bell-shaped curve speed pattern in the case where the operation rhythm instantaneously varies because of some disturbance factors, or the like. The non-bell-shaped curve speed pattern is influenced by disturbance factors, or the like, so it tends to be not a speed pattern that accurately incorporates the driver's driving state.

Here, the extracting unit 225 separates a non-bell-shaped curve speed pattern from the speed pattern of the turning operation speed during a turning operation and then extracts the speed pattern of the turning operation speed, forming a bell-shaped curve speed pattern, to thereby exclude the above described disturbance factors. Then, as will be described later, the EPS control device 211 executes steering wheel return control on the basis of the driver's driving state in the bell-shaped curve speed pattern extracted by the extracting unit 225 from the speed pattern of the turning operation speed during the turning operation.

Specifically, the extracting unit 225 initially partitions a driver's turning operation into unit behaviors each corresponding to one operation. The extracting unit 225 recognizes the partitions of the waveform of the speed pattern of the turning operation speed in the turning operation, and detects the unit behaviors in the turning operation. Driver's driving operation is typically formed of a combination of unit behaviors each having a bell-shaped curve speed pattern as described above, and the duration of each behavior tends to be in accordance with a basic operation rhythm (steering rhythm) that conforms to the Fitts's Law related equation based on a driver's driving state.

Here, the extracting unit 225 may use various conditions based on, for example, the turning operation speed, the absolute value of the turning operation speed, the waveform of the speed pattern of the turning operation speed, and the like, as partition recognition conditions for detecting unit behaviors in a turning operation to recognize the partitions of the waveform of the speed pattern of the turning operation speed and then automatically detect unit behaviors in the turning operation from the speed pattern of the turning operation speed.

Then, the extracting unit 225 recognizes the partitions of the waveform of the speed pattern of the turning operation speed, and determines whether the speed pattern of the turning operation speed in each of the detected unit behaviors satisfies bell-shaped curve speed pattern compatible conditions to thereby determine whether the speed pattern in each unit behavior matches the bell-shaped curve speed pattern. The compatible conditions for a bell-shaped curve speed pattern may apply the above described five conditions (A) to (E). However, in this case, the conditions are applied to a turning operation instead of a returning operation. When the speed pattern of the turning operation speed in each unit behavior satisfies at least one of the five conditions (A) to (E), desirably, satisfies multiple conditions, and most desirably satisfies all the five conditions, the extracting unit 225 determines that the speed pattern of the turning operation speed in the unit behavior matches the bell-shaped curve speed pattern. Then, the extracting unit 225 extracts the speed pattern of the turning operation speed in the unit behavior, which is compatible with the bell-shaped curve speed pattern, from the speed pattern of the turning operation speed during the turning operation.

In this case, it is efficient that the extracting unit 225 is configured to constantly update the waveform shape information (such as the start point, peak height, peak position, presence or absence of a bottom, and the like, of the waveform) of the speed pattern of the operation speed, required to make determination as to the conditions (A) to (E). In addition, the extracting unit 225 may calculate the operation amount (operation displacement) based on the turning operation time and turning operation speed from the start point to the end point of the turning operation time by integrating the area of the speed pattern waveform. Note that the extracting unit 225 is not limited to this configuration; the extracting unit 225 may calculate the above operation amount (operation displacement) by calculating the difference between the steering angle at the start point of an operation and the steering angle at the end point of the operation on the basis of data of operation displacement, typically, the steering angle (operation amount from the neutral position) detected by the steering angle sensor 16.

FIG. 17 is a graph that shows an example of unit behaviors extracted by the extracting unit 225 from the speed pattern of the operation speed. In FIG. 17, the abscissa axis represents time, and the ordinate axis represents steering angle (operation amount from the neutral position) and operation speed. In the graph, the wide-line portions indicate points recognized as partitions.

In the example of FIG. 17, four unit behaviors A1, A2, A3 and A4 having a bell-shaped curve speed pattern are intermittently detected as unit behaviors in a turning operation, and, after that, three unit behaviors B1, B2 and B3 having a bell-shaped curve speed pattern are intermittently detected as unit behaviors in a returning operation corresponding to the turning operation. The speed pattern of the turning operation speed in each of the unit behaviors extracted as described above is a bell-shaped curve speed pattern. Thus, the correlation between an operation speed and a steering angle (operation amount from the neutral position) in each unit behavior is a correlation that conforms to a specific Fitts's Law related equation based on a driving state.

Subsequently, the selecting unit 226 selects a Fitts's Law related equation used to calculate the returning operation time in steering wheel return control. The selecting unit 226 selects a Fitts's Law related equation (or a map corresponding to the equation, and the same applies to the following description) based on a driver's driving state that appears in the bell-shaped curve speed pattern (hereinafter, simply referred to as "extracted bell-shaped speed pattern" where appropriate) in each of the unit behaviors extracted from the turning operation by the extracting unit 225 to thereby incorporate the driver's driving state into steering wheel return control executed thereafter.

More specifically, the selecting unit 226 selects a Fitts's Law related equation based on the driving state on the basis of the extracted bell-shaped speed pattern in the last unit behavior (for example, the unit behavior A4 in the example of FIG. 17) in the turning operation immediately before the returning operation.

The selecting unit 226 may use the extracted bell-shaped speed pattern itself extracted by the extracting unit 225. Here, the selecting unit 226 uses a reference bell-shaped speed pattern close to the extracted bell-shaped speed pattern. The selecting unit 226 selects a reference bell-shaped speed pattern having a high degree of coincidence with the extracted bell-shaped speed pattern on the basis of the width, peak, and the like, of the waveform from among multiple types of reference bell-shaped speed patterns stored in the storage unit 19. By so doing, the selecting unit 226 is able to further suppress the influence of disturbance factors, or the like, at the time of selecting a Fitts's Law related equation on the basis of a driver's driving state.

The selecting unit 226 calculates a reference turning operation time and a reference operation amount from the selected reference bell-shaped speed pattern. The reference turning operation time corresponds to the length of the abscissa axis of the reference bell-shaped speed pattern, that is, a period of time from the start point to the end point of an operation based on the reference bell-shaped speed pattern. The reference turning operation time is a period of time based on a turning operation time in the last unit behavior in the turning operation immediately before the returning operation. The reference operation amount corresponds to the area of the reference bell-shaped speed pattern waveform (value obtained by integrating the reference turning operation speed with respect to the reference turning operation time). The correlation between the reference turning operation time and the reference operation amount, calculated here, is basically a correlation that conforms to a specific Fitts's Law related equation based on the driver's driving state.

The selecting unit 226 substitutes the calculated reference turning operation time and reference operation amount into the Fitts's Law related equation expressed by the mathematical, expression (2) based on the operation rhythm of a human to thereby, for example, use the Fitts's Law related equation expressed by the mathematical expression (2) to calculate a driving state coefficient a on the basis of the reference turning operation time and the reference operation amount. Then, the selecting unit 226 selects a Fitts's Law related equation based on the calculated driving state coefficient a as the Fitts's Law related equation used to calculate a returning operation time in steering wheel return control. The thus selected Fitts's Law related equation is an equation based on the turning operation time of the last turning operation immediately before a returning operation, and, more specifically, an equation based on the driver's driving state at the time of the last turning operation. In other words, the selecting unit 226 is able to change the Fitts's Law related equation used to calculate a returning operation time in steering wheel return control on the basis of a turning operation time of the last turning operation immediately before a returning operation, more specifically, the driver's driving state at the time of the last turning operation.

The operation time calculation unit 21 uses the Fitts's Law related equation selected by the selecting unit 226 to calculate the returning operation time on the basis of the steering angle at the end point of a turning operation or the steering angle at the start point of a returning operation corresponding to the turning operation, and then determines the calculated returning operation time as the returning operation time used in steering wheel return control. The operation speed setting unit 22 sets the speed pattern of the returning operation speed in steering wheel return control to a speed pattern in which a returning operation is completed at the end point of the returning operation time and that has a bell-shaped curve speed pattern on the basis of the returning operation time calculated by the operation time calculation unit 21. Then, the EPS control unit 23 calculates a target supply current supplied to the motor 13 (assist current) on the basis of the returning operation time calculated by the operation time calculation unit 21 and the speed pattern of the returning operation speed, set by the operation speed setting unit 22, and then supplies current to the motor 13 on the basis of the calculated target supply current to execute steering wheel return control.

Next, an example of control executed by the EPS control device 211 will be described with reference to the flow chart shown in FIG. 18.

Initially, the extracting unit 225 of the EPS control device 211 loads the turning operation speed (steering speed) corresponding to the differential value of the steering angle detected by the steering angle sensor 16 (ST31).

Subsequently, the extracting unit 225 uses various conditions to recognize the partition of the waveform of the speed pattern of the turning operation speed, automatically detects a unit behavior in a turning operation from the speed pattern of the turning operation speed, and makes determination as to bell-shaped speed pattern compatibility to determine whether the speed pattern of the turning operation speed in the unit behavior of the turning operation satisfies the bell-shaped curve speed pattern compatible conditions (ST32). When the extracting unit 225 determines that the speed pattern of the turning operation speed in the unit behavior of the turning operation does not satisfy the bell-shaped curve speed pattern compatible conditions (No in ST32), the extracting unit 225 ends the current control cycle and proceeds to the next control cycle.

In determination as to bell-shaped sped pattern compatibility, when the extracting unit 225 determines that the speed pattern of the turning operation speed in the unit behavior of the turning operation satisfies the bell-shaped curve speed pattern compatible conditions (Yes in ST32), the extracting unit 225 extracts the speed pattern of the turning operation speed in the unit behavior compatible with the bell-shaped curve speed pattern from the speed pattern of the turning operation speed in the turning operation. Then, the selecting unit 226 of the EPS control device 211 selects a reference bell-shaped speed pattern close to the extracted bell-shaped speed pattern (ST33).

Subsequently, the selecting unit 226 calculates a reference turning operation time and a reference operation amount on the basis of the selected reference bell-shaped speed pattern (ST34).

Then, the selecting unit 226 calculates a driving state coefficient a from the calculated reference turning operation time and the reference operation amount, and selects a Fitts's Law related equation based on the calculated driving state coefficient a as the Fitts's Law related equation used to calculate a returning operation time in steering wheel return control (ST35).

Subsequently, the operation time calculation unit 21 of the EPS control device 211 calculates a returning operation time in steering wheel return control on the basis of the steering angle detected by the steering angle sensor 16 (ST36). The operation time calculation unit 21 uses the Fitts's Law related equation selected by the selecting unit 226 to calculate a returning operation time on the basis of the steering angle at the end point of the turning operation or the steering angle at the start point of a returning operation corresponding to the turning operation.

Subsequently, the operation speed setting unit 22 of the EPS control device 211 sets the speed pattern of the returning operation speed in steering wheel return control to a speed pattern in which a returning operation is completed at the end point of the returning operation time and that is a bell-shaped curve speed pattern on the basis of the returning operation time calculated by the operation time calculation unit 21 in ST36, and calculates the speed pattern as a bell-shaped target speed (ST37).

Subsequently, the determination unit 24 of the EPS control device 211 makes steering wheel returning operation determination on the basis of various results detected by the state detecting device 10, and determines whether a returning operation for returning the steering wheel 5 is performed by the driver (ST38). When the determination unit 24 determines that a returning operation for returning the steering wheel 5 is not performed (No in ST38), the EPS control device 211 ends the current control cycle and proceeds to the next control cycle.

When the determination unit 24 determines that a returning operation for returning the steering wheel 5 is performed (Yes in ST38), the EPS control unit 23 of the EPS control device 211 calculates a target supply current supplied to the motor 13 (assist current) on the basis of the returning operation time calculated by the operation time calculation unit 21 in ST36 and the bell-shaped target speed calculated by the operation speed setting unit 22 in ST37 as steering wheel returning operation assist computation, and supplies current to the motor 13 on the basis of the calculated target supply current (ST39). Then, the EPS control unit 23 ends the current control cycle, and proceeds to the next control cycle.

The thus configured steering system 201 selects a Fitts's Law related equation, used to calculate a returning operation time in steering wheel return control on the basis of the driver's driving state in the turning operation, on the basis of the turning operation time of the turning operation prior to a returning operation (here, the reference turning operation time based on the turning operation time), and uses the selected Fitts's Law related equation to calculate a returning operation time. By so doing, the steering system 201 is able to change the returning operation time in steering wheel return control on the basis of the turning operation time in the turning operation. As a result, the steering system 201 is able to assist the driver in the returning operation for returning the steering wheel 5 along with the driver's driving state at the time of the turning operation prior to a returning operation. By so doing, for example, when the driver relatively quickly performs turning operation and the turning operation speed is relatively high, the steering system 201 relatively increases the returning operation speed to make it possible to assist the driver so that the returning operation for returning the steering wheel 5 is also a relatively quick operation similarly. In addition, on the other hand, when the driver relatively slowly performs turning operation and the turning operation speed is relatively low, the steering system 201 relatively decreases the returning operation speed to make it possible to assist the driver so that the returning operation for returning the steering wheel 5 is also a relatively slow operation similarly. For example, the steering system 201 is able to assist the driver in the returning operation for returning the steering wheel 5 so that the steering wheel 5 quickly returns to the neutral position when the turning operation time is short and the turning operation speed is high; whereas, the steering system 201 is able to assist the driver in the returning operation for returning the steering wheel 5 so that the steering wheel 5 slowly returns to the neutral position when the turning operation time is long and the turning operation speed is low.

In addition, in the steering system 201, when a returning operation is interrupted and then the returning operation is resumed, the EPS control device 211 (operation time calculation unit 21) continuously uses the above selected Fitts's Law related equation to calculate a returning operation time on the basis of the steering angle at the start point of the resumed returning operation. Thus, for a returning operation resumed after once interrupted as well, the steering system 201 is able to assist the driver in the returning operation for returning the steering wheel 5 with the returning operation time and the returning operation speed that match the driver's driving state at the time of the turning operation, so it is possible to improve steering feeling.

Thus, the steering system 201 and the EPS control device 211 according to the above described embodiment are able to execute steering wheel return control that matches the operating characteristics of a human on the basis of the steering angle at the time of a turning operation. Therefore, it is possible to assist the driver in the returning operation for returning the steering wheel 5 along with the operating characteristics (steering rhythm) of a human. By so doing, it is possible to improve steering feeling.

Then, with the steering system 201 and the EPS control device 211 according to the above described embodiment, the returning operation time is changed on the basis of a turning operation time in a turning operation. Thus, the steering system 201 and the EPS control device 211 are able to assist the driver in the returning operation for returning the steering wheel 5 along with the driver's driving state at the time of a turning operation prior to a returning operation. By so doing, it is possible to further improve steering feeling.

Third Embodiment

Figure 19:
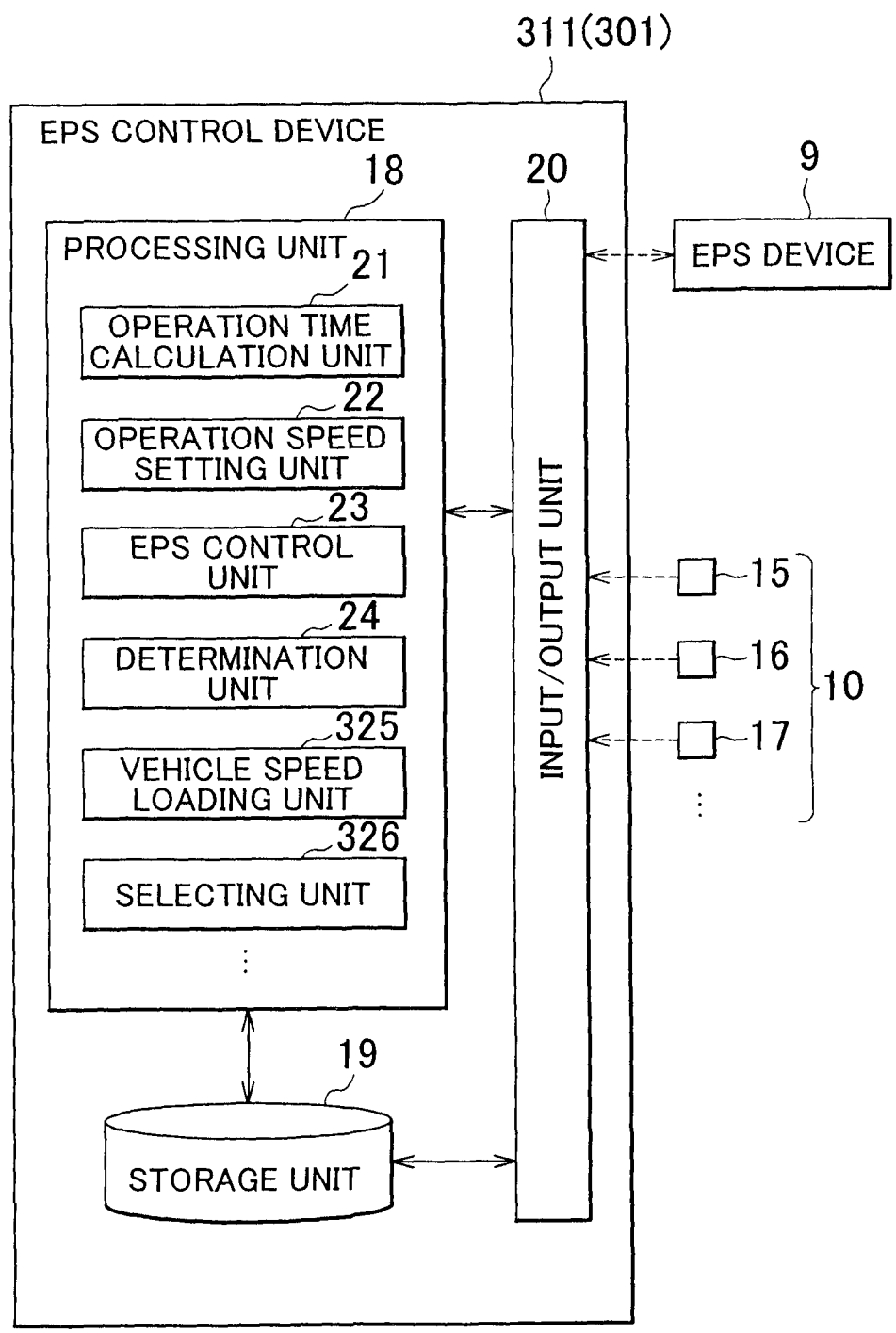
FIG. 19 is a schematic block diagram that shows the schematic configuration of an EPS control device according to a third embodiment.
Figure 20:
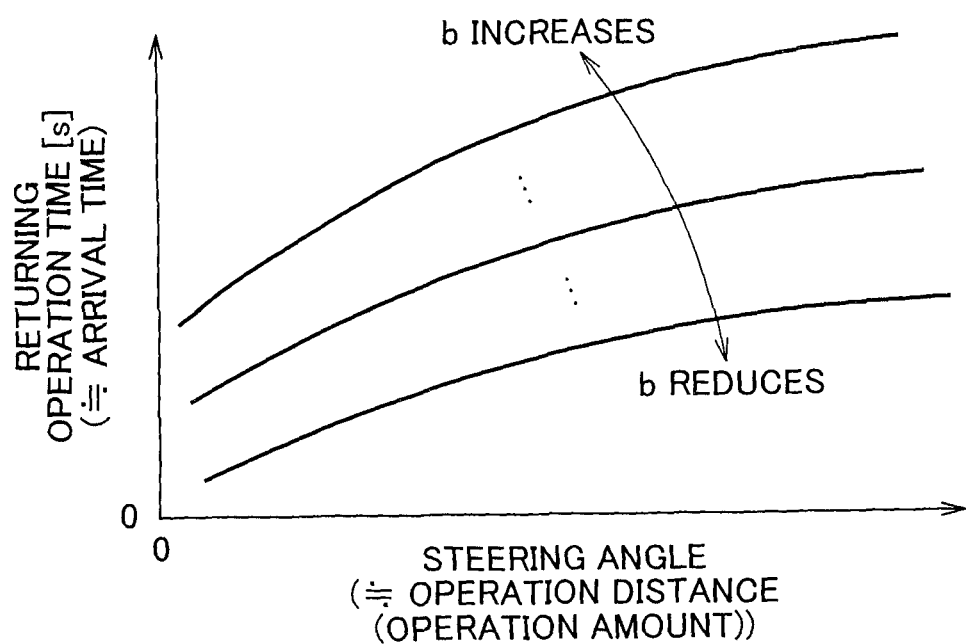
FIG. 20 is a graph that shows an example of the correlation among a returning operation time, a steering angle and a vehicle speed coefficient in Fitts's Law related equation in connection with a returning operation time according to the third embodiment.
Figure 21:
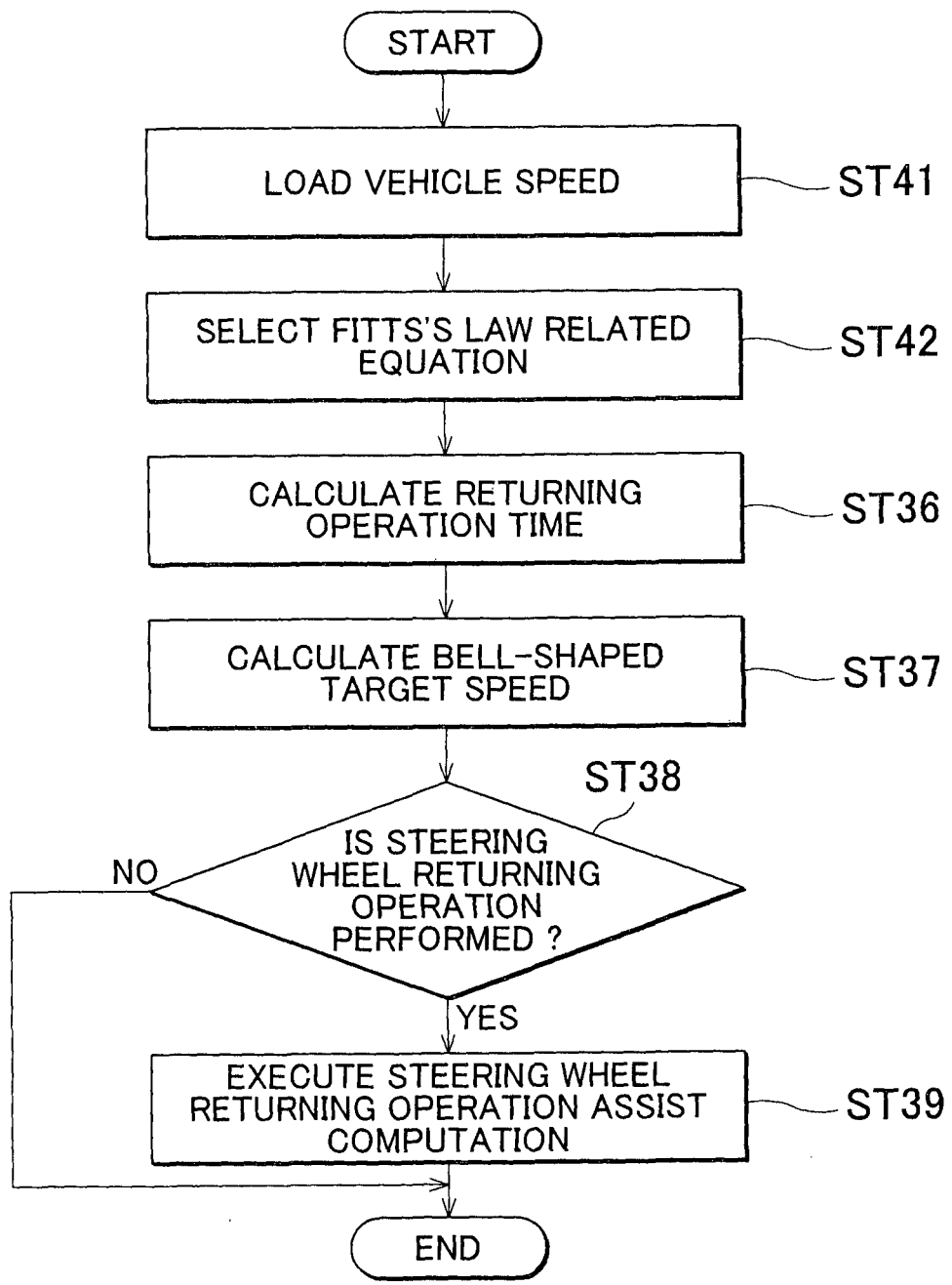
FIG. 21 is a flow chart that illustrates an example of control executed by the EPS control device according to the third embodiment.

FIG. 19 is a schematic block diagram that shows the schematic configuration of an EPS control device according to a third embodiment. FIG. 20 is a graph that shows an example of the correlation among a returning operation time, a steering angle and a vehicle speed coefficient in Fitts's Law related equation in connection with a returning operation time according to the third embodiment. FIG. 21 is a flow chart that illustrates an example of control executed by the EPS control device according to the third embodiment. The steering system and the steering control device according to the third embodiment differ from those of the first and second embodiments in that the returning operation time is changed on the basis of a vehicle speed of the vehicle.

A steering system 301 according to the present embodiment shown in FIG. 19 includes an EPS control device 311 as a steering control device. The EPS control device 311 according to the present embodiment changes the returning operation time in steering wheel return control on the basis of the vehicle speed of the vehicle 2.

The steering system 301 uses a Fitts's Law related equation expressed by the following mathematical expression (3) to calculate the returning operation time in steering wheel return control. In the mathematical expression (3), "t" denotes an arrival time required to move an operation point to a target point, "D" denotes an operation distance from a start point to the target point, "X" is a compatible value determined on the basis of an actual vehicle evaluation, or the like, and "b" denotes a vehicle speed coefficient based on a vehicle speed. The vehicle speed coefficient b relatively reduces when the vehicle speed of the vehicle 2 is relatively high, and relatively increases when the vehicle speed of the vehicle 2 is relatively low. Note that the vehicle speed coefficient b also correlates with the above described driver's driving state or driving state coefficient a, and may be regarded as a parameter that varies with the driving state coefficient a or a parameter alternative to the driving state coefficient a. For example, when the vehicle speed coefficient b is relatively small (that is, when the vehicle speed of the vehicle 2 is relatively high), it tends to be in a driving state where the driver performs relatively quick operation; whereas, when the vehicle speed coefficient b is relatively large (that is, when the vehicle speed of the vehicle 2 is relatively low), it tends to be in a driving state where the driver performs relatively slow operation.

$$t \approx b \cdot D^X \qquad (3)$$

When the above Fitts's Law related equation is applied to steering wheel return control in the steering system 301 according to the present embodiment, as in the case where the Fitts's Law equation is applied, the returning operation time corresponds to the arrival time t, and the steering angle corresponding to the operation amount of the steering wheel 5 from the neutral position (target point) corresponds to the operation distance D.

FIG. 20 shows an example of the correlation among [returning operation time (≈arrival time)], [steering angle≈operation distance (operation amount from the neutral position)] and [vehicle speed coefficient b], determined by the Fitts's Law related equation that is the mathematical expression (3). As shown in FIG. 20, [returning operation time] extends with an increase in [steering angle], and extends with an increase in [vehicle speed coefficient b]. Thus, the returning operation time reduces when the vehicle speed is relatively high, and relatively extends when the vehicle speed is relatively low.

The EPS control device 311 selects a Fitts's Law related equation on the basis of the vehicle speed at the time of executing steering wheel return control, and calculates a returning operation time from the steering angle on the basis of the selected Fitts's Law related equation. Note that the above Fitts's Law related equation is, for example, prestored in the storage unit 19 in a mathematical model as shown in the mathematical expression (3) or a map form as shown in FIG. 20.

Specifically, in the EPS control device 311, the processing unit 18 functionally conceptually further includes a vehicle speed loading unit 325 and a selecting unit 326 in addition to the operation time calculation unit 21, the operation speed setting unit 22, the EPS control unit 23 and the determination unit 24.

The vehicle speed loading unit 325 loads the vehicle speed of the vehicle 2, detected by the vehicle speed sensor 17.

The selecting unit 326 selects a Fitts's Law related equation used to calculate a returning operation time in steering wheel return control. The selecting unit 326 selects a Fitts's Law related equation (or a map corresponding to the equation, and the same applies to the following description) on the basis of the vehicle speed of the vehicle 2, loaded by the vehicle speed loading unit 325, to thereby incorporate the vehicle speed of the vehicle 2 into steering wheel return control executed thereafter.

More specifically, the selecting unit 326, for example, multiplies the vehicle speed of the vehicle 2 by a predetermined coefficient to calculate a vehicle speed coefficient b based on the vehicle speed. Then, the selecting unit 326 selects a Fitts's Law related equation based on the calculated vehicle speed coefficient b as the Fitts's Law related equation used to calculate a returning operation time in steering wheel return control. The thus selected Fitts's Law related equation is an equation based on the vehicle speed of the vehicle 2. In other words, the selecting unit 326 is able to change the Fitts's Law related equation used to calculate a returning operation time in steering wheel return control on the basis of the vehicle speed of the vehicle 2.

The operation time calculation unit 21 uses the Fitts's Law related equation selected by the selecting unit 326 to calculate a returning operation time on the basis of the steering angle at the end point of a turning operation or the steering angle at the start point of a returning operation corresponding to the turning operation, and then determines the calculated returning operation time as the returning operation time used in steering wheel return control. The operation speed setting unit 22 sets the speed pattern of the returning operation speed in steering wheel return control to a speed pattern in which a returning operation is completed at the end point of the returning operation time and that has a bell-shaped curve speed pattern on the basis of the returning operation time calculated by the operation time calculation unit 21. Then, the EPS control unit 23 calculates a target supply current supplied to the motor 13 (assist current) on the basis of the returning operation time calculated by the operation time calculation unit 21 and the speed pattern of the returning operation speed, set by the operation speed setting unit 22, and then supplies current to the motor 13 on the basis of the calculated target supply current to execute steering wheel return control.

Next, an example of control executed by the EPS control device 311 will be described with reference to the flow chart shown in FIG. 21.

Initially, the vehicle speed loading unit 325 of the EPS control device 311 loads the vehicle speed of the vehicle 2, detected by the vehicle speed sensor 17 (ST41).

Then, the selecting unit 326 selects a Fitts's Law related equation based on the vehicle speed as the Fitts's Law related equation used to calculate a returning operation time in steering wheel return control on the basis of the vehicle speed loaded by the vehicle speed loading unit 325 (ST42).

Subsequently, the operation time calculation unit 21 of the EPS control device 311 calculates a returning operation time in steering wheel return control on the basis of the steering angle detected by the steering angle sensor 16 (ST36). The operation time calculation unit 21 uses the Fitts's Law related equation selected by the selecting unit 326 to calculate a returning operation time on the basis of the steering angle at the end point of a turning operation or the steering angle at the start point of a returning operation corresponding to the turning operation. The following processes are similar to the processes of ST37 to ST39 described in the above embodiment, so the description thereof is omitted.

The thus configured steering system 301 selects a Fitts's Law related equation used to calculate a returning operation time in steering wheel return control on the basis of the vehicle speed of the vehicle 2, and then calculates the returning operation time using the selected Fitts's Law related equation. By so doing, the steering system 301 is able to change the returning operation time in steering wheel return control on the basis of the vehicle speed of the vehicle 2. As a result, the steering system 301 is able to assist the driver in the returning operation for returning the steering wheel 5 along with the operating characteristics of a human based on the vehicle speed of the vehicle 2. By so doing, for example, when the vehicle speed is relatively high (for example, when it tends to be in a driving state where the driver performs relatively quick operation), the steering system 301 relatively increases the returning operation speed, so it is possible to assist the driver in the returning operation for returning the steering wheel 5 so as to perform relatively quick operation. In addition, on the other hand, when the vehicle speed is relatively low (for example, when it tends to be in a driving state where the driver performs relatively slow operation), the steering system 301 relatively decreases the returning operation speed, so it is possible to assist the driver in the returning operation for returning the steering wheel 5 so as to perform relatively slow operation. That is, the steering system 301 is able to assist the driver in the returning operation for returning the steering wheel 5 so that the steering wheel 5 quickly returns to the neutral position when the vehicle speed is high; whereas, the steering system 301 is able to assist the driver in the returning operation for returning the steering wheel 5 so that the steering wheel 5 slowly returns to the neutral position when the vehicle speed is low.

Thus, the steering system 301 and the EPS control device 311 according to the above described embodiment are able to execute steering wheel return control that matches the operating characteristics of a human on the basis of the steering angle at the time of a turning operation. Therefore, it is possible to assist the driver in the returning operation for returning the steering wheel 5 along with the operating characteristics (steering rhythm) of a human. By so doing, it is possible to improve steering feeling.

Then, with the steering system 301 and the EPS control device 311 according to the above described embodiment, the returning operation time is changed on the basis of the vehicle speed of the vehicle 2. Thus, the steering system 301 and the EPS control device 311 are able to assist the driver in the returning operation for returning the steering wheel 5 along with the operating characteristics of a human based on the vehicle speed of the vehicle 2. By so doing, it is possible to further improve steering feeling.

Fourth Embodiment

Figure 22:
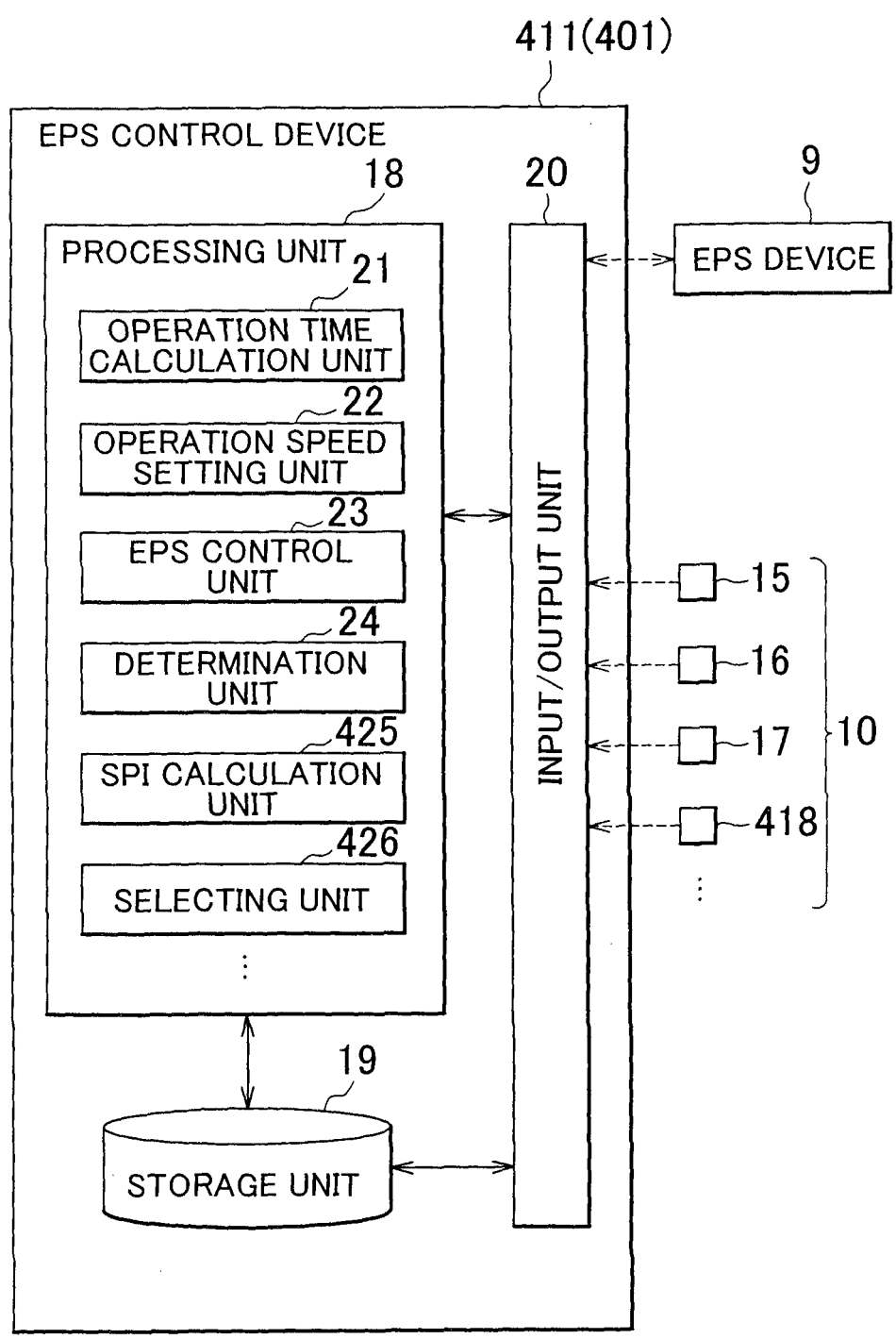
FIG. 22 is a schematic block diagram that shows the schematic configuration of an EPS control device according to a fourth embodiment.
Figure 23:
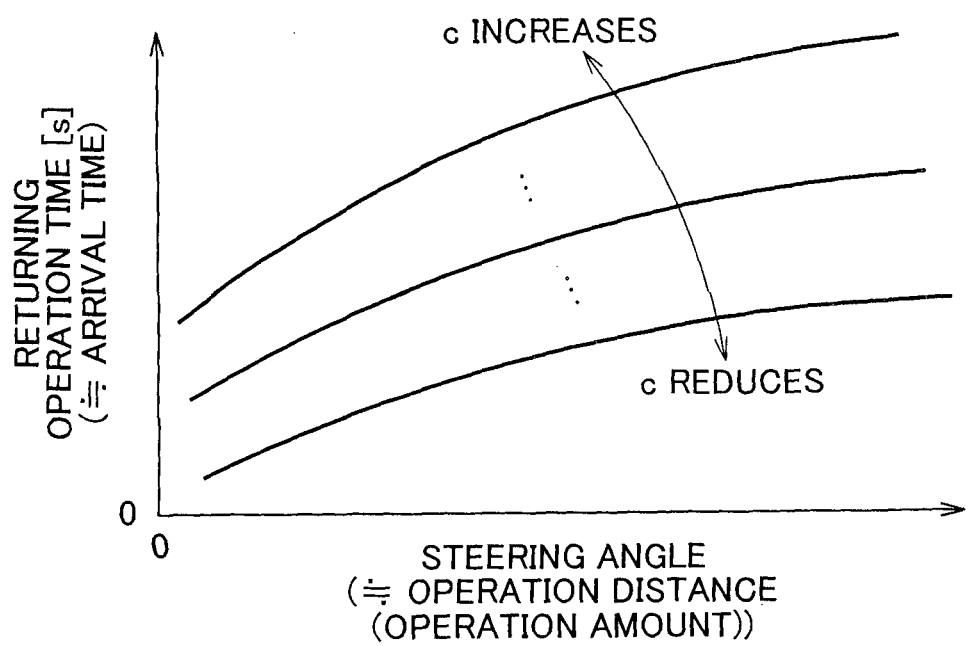
FIG. 23 is a graph that shows an example of the correlation among a returning operation time, a steering angle and an SPI coefficient in Fitts's Law related equation in connection with a returning operation time according to the fourth embodiment.
Figure 24:
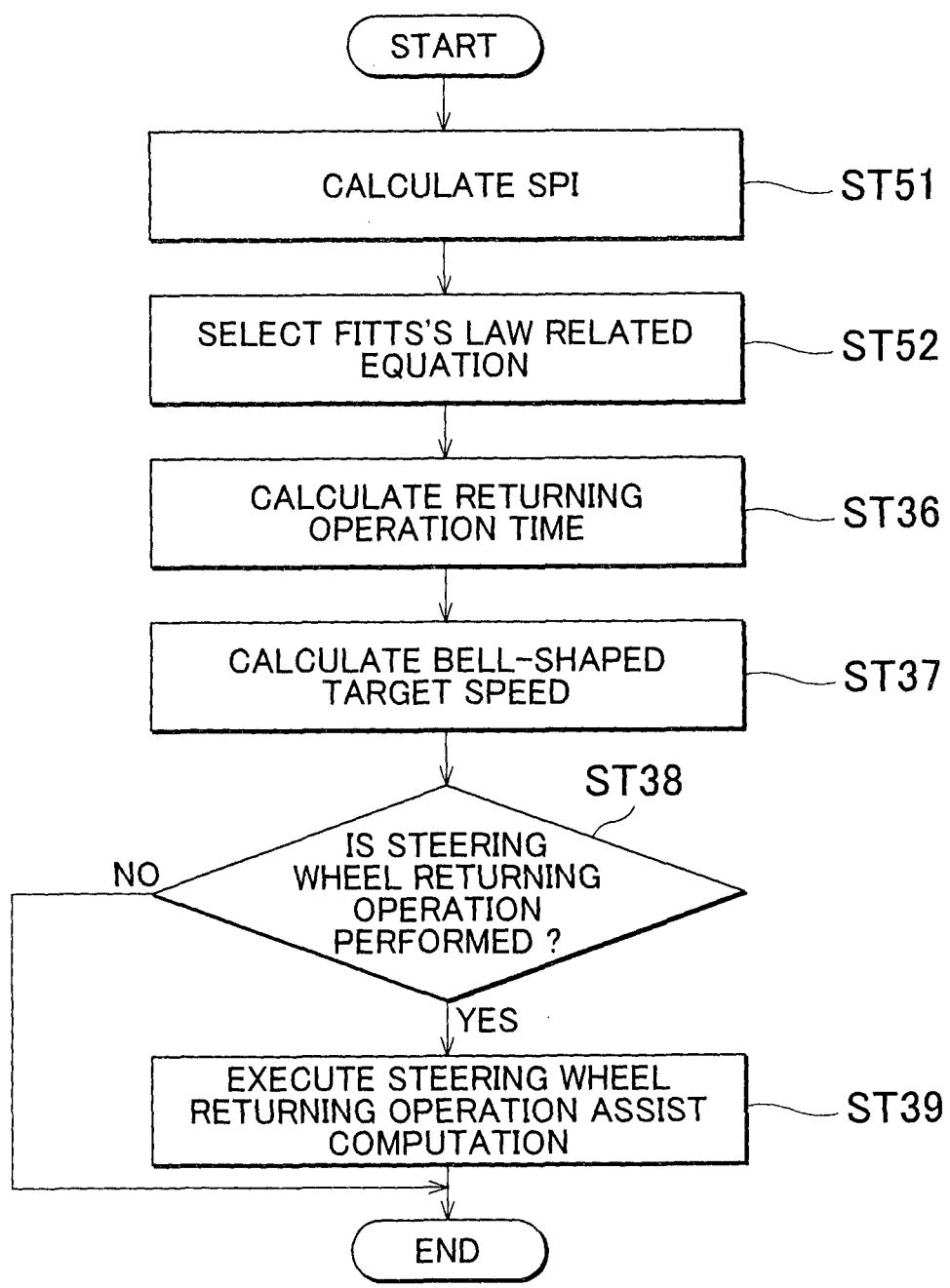
FIG. 24 is a flow chart that illustrates an example of control executed by the EPS control device according to the fourth embodiment.

FIG. 22 is a schematic block diagram that shows the schematic configuration of an EPS control device according to a fourth embodiment. FIG. 23 is a graph that shows an example of the correlation among a returning operation time, a steering angle and an SPI coefficient in Fitts's Law related equation in connection with a returning operation time according to the fourth embodiment. FIG. 24 is a flow chart that illustrates an example of control executed by the EPS control device according to the fourth embodiment. The steering system and the steering control device according to the fourth embodiment differ from those of the first, second and third embodiments in that the returning operation time is changed on the basis of the running state of the vehicle.

A steering system 401 according to the present embodiment shown in FIG. 22 includes an EPS control device 411 as a steering control device. The EPS control device 411 according to the present embodiment changes the returning operation time in steering wheel return control on the basis of the running state of the vehicle 2. The EPS control device 411 according to the present embodiment changes the returning operation time in steering wheel return control on the basis of a sports index SPI that is an index indicating a driver's intention as a parameter that varies with the running state of the vehicle 2.

Here, the sports index SPI is an index that indicates the running state of the vehicle 2, and is, for example, an index based on a resultant acceleration (resultant force acceleration) determined on the basis of accelerations in multiple directions, applied to the vehicle body of the vehicle 2. The sports index SPI increases with an increase in resultant acceleration. That is, the running state of the vehicle 2 here is a state indicated by the longitudinal acceleration, lateral acceleration, yawing or rolling acceleration or resultant of these accelerations of the vehicle 2. For example, when the vehicle 2 is caused to run at a target speed or caused to travel in a target direction or when the behavior of the vehicle 2 is returned to an original state after receiving the influence of a running environment, such as a road surface, accelerations in multiple directions are generally applied to the vehicle body of the vehicle 2, so the sports index SPI here presumably incorporates a running state and a driving orientation to some degree.

The steering system 401 uses a Fitts's Law related equation expressed by the following mathematical expression (4) to calculate a returning operation time in steering wheel return control. In the mathematical expression (4), "t" denotes an arrival time required to move an operation point to a target point, "D" denotes an operation distance from a start point to the target point, "X" is a compatible value determined on the basis of an actual vehicle evaluation, or the like, and "c" denotes an SPI coefficient based on a sports index SPI. The SPI coefficient c relatively reduces when the sports index SPI is relatively large, and relatively increases when the sports index SPI is relatively small. Note that the SPI coefficient c also correlates with the above described driver's driving state or driving state coefficient a, and may be regarded as a parameter that varies with the driving state coefficient a or a parameter alternative to the driving state coefficient a. For example, when the SPI coefficient c is relatively small (that is, when the sports index SPI is relatively large), it tends to be in a driving state where sporty running orientation is strong and the driver performs relatively quick operation; whereas, when the SPI coefficient c is relatively large (that is, when the SPI is relatively small), it tends to be in a driving state where not sporty running orientation but normal running orientation is strong and the driver performs relatively slow operation.

$$t \approx c \cdot D^X \qquad (4)$$

When the above Fitts's Law related equation is applied to steering wheel return control in the steering system 401, as in the case where the Fitts's Law equation is applied, the returning operation time corresponds to the arrival time t, and the steering angle corresponding to the operation amount of the steering wheel 5 from the neutral position (target point) corresponds to the operation distance D.

FIG. 23 shows an example of the correlation among [returning operation time (≈arrival time)], [steering angle≈operation distance (operation amount from the neutral position)] and [SPI coefficient c], determined by the Fitts's Law related equation that is the mathematical expression (4). As shown in FIG. 23, [returning operation time] extends with an increase in [steering angle], and extends with an increase in [SPI coefficient c]. Thus, the returning operation time reduces when the sports index SPI is relatively large, and relatively extends when the sports index SPI is relatively low.

The EPS control device 411 selects a Fitts's Law related equation on the basis of the sports index SPI at the time of executing steering wheel return control, and calculates a returning operation time from the steering angle on the basis of the selected Fitts's Law related equation. Mite that the above Fitts's Law related equation is, for example, prestored in the storage unit 19 in a mathematical model as shown in the mathematical expression (4) or a map form as shown in FIG. 23.

Specifically, in the EPS control device 411, the processing unit 18 functionally conceptually further includes an SPI calculation unit 425 and a selecting unit 426 in addition to the operation time calculation unit 21, the operation speed setting unit 22, the EPS control unit 23 and the determination unit 24.

The SPI calculation unit 425 calculates a sports index SPI that is an index indicating a driver's intention. The sports index SPI is typically an index obtained as a resultant of accelerations (desirably, the absolute values thereof) in multiple directions, and a resultant acceleration of the longitudinal acceleration and the lateral acceleration that are accelerations significantly associated with a behavior in the running direction is an example of the sports index SPI. The sports index SPI may be, for example, a resultant acceleration of the absolute values of two-direction accelerations that are the longitudinal acceleration and the lateral acceleration, an acceleration expressed by the square root of the sum of squares of the accelerations, or the like. The sports index SPI may be, for example, calculated by $[SPI=(Gx^2+Gy^2)^{1/2}]$ the longitudinal acceleration Gx and the lateral acceleration Gy are used. The state detecting device 10 in the present embodiment is configured to also include an acceleration sensor 418 that detects the longitudinal acceleration and the lateral acceleration that are applied to the vehicle body of the vehicle 2. Here, the SPI calculation unit 425 calculates a sports index SPI using the above described mathematical expression on the basis of the longitudinal acceleration and the lateral acceleration detected by the acceleration sensor 418.

Note that the SPI calculation unit 425 may execute various correction processes on the sports index SPI calculated as described above. The thus calculated sports index SPI is a so-called instantaneous SPI that is an index calculated on the basis of accelerations in the respective directions, obtained each instance during running of the vehicle 2. In contrast to this, the SPI calculation unit 425 executes correction process on the sports index SPI to calculate a so-called command SPI that is an index configured so as to be immediately increased when the running state of the vehicle 2 changes in a direction to increase the instantaneous SPI and decreased with a delay from a change in the running state of the vehicle 2 in a direction to decrease the instantaneous SPI, and may set the command SPI as an actually used sports index SPI. The command SPI is set at the local maximum value of the instantaneous SPI, and is, for example, configured to keep the last value until a predetermined condition based on a lapse of time, or the like, is satisfied. In this case, the command SPI quickly varies toward an increasing side but relatively slowly varies toward a decreasing side.

The selecting unit 426 selects a Fitts's Law related equation used to calculate a returning operation time in steering wheel return control. The selecting unit 426 selects a Fitts's Law related equation (or a map corresponding to the equation, and the same applies to the following description) on the basis of the sports index SPI calculated by the SPI calculation unit 425, to thereby incorporate the sports index SPI into steering wheel return control executed thereafter.

More specifically, the selecting unit 426, for example, multiples the sports index SPI, calculated by the SPI calculation unit 425, by a predetermined coefficient to calculate an SPI coefficient c based on the sports index SPI. Then, the selecting unit 426 selects a Fitts's Law related equation based on the calculated SPI coefficient c as the Fitts's Law related equation used to calculate a returning operation time in steering wheel return control. The thus selected Fitts's Law related equation is an equation based on the sports index SPI. In other words, the selecting unit 426 is able to change the Fitts's Law related equation used to calculate a returning operation time in steering wheel return control on the basis of the sports index SPI.

The operation time calculation unit 21 uses the Fitts's Law related equation selected by the selecting unit 426 to calculate a returning operation time on the basis of the steering angle at the end point of a turning operation or the steering angle at the time of the start point of a returning operation corresponding to the turning operation, and then determines the calculated returning operation time as the returning operation time used in steering wheel return control. The operation speed setting unit 22 sets the speed pattern of the returning operation speed in steering wheel return control as a speed pattern in which a returning operation is completed at the end point of the returning operation time and that has a bell-shaped curve speed pattern on the basis of the returning operation time calculated by the operation time calculation unit 21. Then, the EPS control unit 23 calculates a target supply current supplied to the motor 13 (assist current) on the basis of the returning operation time calculated by the operation time calculation unit 21 and the speed pattern of the returning operation speed, set by the operation speed setting unit 22, and then supplies current to the motor 13 on the basis of the calculated target supply current to execute steering wheel return control.

Next, an example of control executed by the EPS control device 411 will be described with reference to the flow chart shown in FIG. 24.

Initially, the SPI calculation unit 425 of the EPS control device 411 calculates a sports index SPI that is an index indicating a driver's intention (ST51). The SPI calculation unit 425 calculates a sports index SPI using the above described mathematical expression on the basis of the longitudinal acceleration and the lateral acceleration detected by the acceleration sensor 418.

Then, the selecting unit 426 selects a Fitts's Law related equation based on the sports index SPI as the Fitts's Law related equation used to calculate a returning operation time in steering wheel return control on the basis of the sports index SPI calculated by the SPI calculation unit 425 (ST52).

Subsequently, the operation time calculation unit 21 of the EPS control device 411 calculates a returning operation time in steering wheel return control on the basis of the steering angle detected by the steering angle sensor 16 (ST36). The operation time calculation unit 21 uses the Fitts's Law related equation selected by the selecting unit 426 to calculate a returning operation time on the basis of the steering angle at the end point of a turning operation or the steering angle at the time of the start point of a returning operation corresponding to the turning operation. The following processes are similar to the processes of ST37 to ST39 described in the above embodiments, so the description thereof is omitted.

The thus configured steering system 401 selects a Fitts's Law related equation used to calculate a returning operation time in steering wheel return control on the basis of, the running state of the vehicle 2, here, the sports index SPI that is a parameter that varies on the basis of the running state of the vehicle 2, and then calculates a returning operation time using the selected Fitts's Law related equation. By so doing, the steering system 401 is able to change the returning operation time in steering wheel return control on the basis of the sports index SPI that varies on the basis of the running state of the vehicle 2. As a result, the steering system 401 is able to assist the driver in the returning operation for returning the steering wheel 5 along with the operating characteristics of a human based on the sports index SPI. By so doing, for example, when the sports index SPI is relatively large, that is, the resultant acceleration is high and, for example, sporty running orientation is strong (when it tends to be in a driving state where the driver performs relatively quick operation), the steering system 401 relatively increases the returning operation, speed, so it is possible to assist the driver in the returning operation for returning the steering wheel 5 so as to perform relatively quick operation. In addition, on the other hand, when the sports index SPI is relatively small, that is, the resultant acceleration is low and, for example, not sporty running orientation but normal running orientation is strong (when it tends to be in a driving state where the driver performs relatively slow operation), the steering system 401 relatively decreases the returning operation speed, so it is possible to assist the driver in the returning operation for returning the steering wheel 5 so as to perform relatively slow operation. That is, the steering system 401 is able to assist the driver in the returning operation for returning the steering wheel 5 so that the steering wheel 5 quickly returns to the neutral position when the sports index SPI is large and sporty running orientation is strong; whereas, the steering system 401 is able to assist the driver in the returning operation for returning the steering wheel 5 so that the steering wheel 5 slowly returns to the neutral position when the sports index SPI is small and normal running orientation is strong.

Thus, the steering system 401 and the EPS control device 411 according to the above described embodiment are able to execute steering wheel return control that matches the operating characteristics of a human on the basis of the steering angle at the time of a turning operation. Therefore, it is possible to assist the driver in the returning operation for returning the steering wheel 5 along with the operating characteristics (steering rhythm) of a human. By so doing, it is possible to improve steering feeling.

Then, with the steering system 401 and the EPS control device 411 according to the above described embodiment, the returning operation time is changed on the basis of the running state of the vehicle 2. Thus, the steering system 401 and the EPS control device 411 are able to assist the driver in the returning operation for returning the steering wheel 5 along with the operating characteristics of a human based on the running state of the vehicle 2. By so doing, it is possible to further improve steering feeling.

Note that, in the above description, the EPS control device 411 changes the returning operation time in steering wheel return control on the basis of the sports index SPI that is an index indicating a driver's intention as a parameter that varies on the basis of the running state of the vehicle 2; however, the EPS control device 411 is not limited to this configuration. The EPS control device 411 may change the returning operation time in steering wheel return control on the basis of, for example, a set mode of another actuator, peripheral running environment information of the vehicle 1 (for example, current position information of the vehicle 2, map information (road gradient information, road surface condition information, road shape information, vehicle speed limit information, road curvature information, and the like), infrastructure information (traffic signal information, construction and traffic control information, traffic congestion information and emergency vehicle information), and information about a vehicle ahead, which runs ahead of the vehicle 2 (speed information, current position information, and the like)), or the like, acquired from a navigation system, a peripheral environment information acquisition device, a mode change switch that may be changed by the driver, or the like, as the running state of the vehicle 2, instead of the sports index SPI. That is, the EPS control device 411 may change the Fitts's Law related equation used to calculate a returning operation time in steering wheel return control on the basis of a set mode of another actuator, peripheral running environment information of the vehicle 2, a mode change switch that may be changed by the driver, or the like. In this case as well, the steering system 401 and the EPS control device 411 are able to assist the driver in the returning operation for returning the steering wheel 5 along with the operating characteristics (steering rhythm) of a human based on the running state of the vehicle 2. By so doing, it is possible to further improve steering feeling.

Note that the steering system and the steering control device according to the aspects of the invention are not limited to the above described embodiments; they may be modified in various forms within the scope of the appended claims. The steering system and the steering control device according to the aspects of the invention may be implemented by a combination of the component elements of the embodiments described above where appropriate.

In the above description, the steering control device uses so-called Fitts's Law to calculate a returning operation time on the basis of the steering angle of the steering member at the time of a turning operation; however, the aspects of the invention are not limited to this configuration. The steering control device just needs to determine a returning operation time on the basis of the steering angle of the steering member at the time of a turning operation, and just needs to calculate a returning operation time as a period of time during which the steering member may be smoothly returned to the neutral position on the basis of the steering operation amount of the steering member at the time of a turning operation using various methods.

In the above description, the steering control device sets the speed pattern of the returning operation speed for a returning operation time as a so-called bell-shaped curve speed pattern; however, the aspects of the invention are not limited to this configuration.

In the above description, the steering system is a column assist-type column EPS device; however, the steering system is not limited to this configuration. For example, the steering system may be applied to any type, such as a pinion assist type and a rack assist type.

The above described steering system and steering control device may be applied to a so-called steer-by-wire steering system. In this case, the steering system is formed such that a steering member (for example, the steering wheel 5) and steered wheels are structurally separated. Then, in the steer-by-wire steering system, when the steering member is operated by the driver, the operation amount of the steering member is detected by a sensor, or the like, the steering control device drives a steering actuator on the basis of the detected operation amount to apply predetermined turning force to the steered wheels to thereby turn the steered wheels. When the above described steering system and steering control device are applied to such a steer-by-wire steering system, the steering system and the steering control device control an actuator (for example, the steering actuator is used) that assists steering operation on the steering member to make it possible to execute returning operation assist control for assisting a returning operation for returning the steering member to the neutral position, corresponding to a turning operation for turning the steering member from the neutral position. The steering system and the steering control device determine a returning operation time at the time of executing the returning operation assist control on the basis of the steering angle of the steering member at the time of a turning operation. By so doing, it is possible to improve steering feeling.

The invention claimed is:

1. A steering system comprising:
a steering member that is provided on a vehicle and that is used for a steering operation;
an actuator configured to assist the steering operation of the steering member; and a steering control device configured to execute returning operation assist control in which the actuator is controlled to assist a returning operation for returning the steering member to a neutral position, the returning operation corresponding to a turning operation for turning the steering member from the neutral position, and that determines a returning operation time at the time of executing the returning operation assist control on the basis of a steering operation amount of the steering member at the time of the turning operation.

2. The steering system according to claim 1, wherein the steering control device is configured to complete the returning operation to a target return position based on the neutral position of the steering member at an end point of the returning operation time in the returning operation assist control.

3. The steering system according to claim 1, wherein the steering operation amount of the steering member at the time of the turning operation is a steering operation amount of the steering member at an end point of the turning operation or a steering operation amount of the steering member at a start point of the returning operation corresponding to the turning operation.

4. The steering system according to claim 1, wherein, when the returning operation is resumed after the returning operation is interrupted, the steering control device is configured to determine the returning operation time on the basis of a steering operation amount of the steering member at a start point of the resumed returning operation.

5. The steering system according claim 1, wherein the steering control device is configured to execute the returning operation assist control on the basis of the returning operation time and a returning operation speed based on the returning operation time, and the returning operation speed has a speed pattern such that an absolute value of the returning operation speed increases with a lapse of the returning operation time and then reduces after passing a peak.

6. The steering system according to claim 5, wherein the speed pattern of the returning operation speed for the returning operation time satisfies at least one of following conditions that:

i) a deviation between a local maximum value, other than a maximum value, of the absolute value of the returning operation speed and a local minimum value of the absolute value of the returning operation speed is smaller than or equal to a first predetermined value, ii) an operation amount based on the returning operation time and the returning operation speed from a start point of the returning operation time to an end point of the returning operation time is larger than or equal to a second predetermined value, iii) the operation amount falls within a predetermined range, iv) a deviation between the maximum value of the absolute value of the returning operation speed and an absolute value of the returning operation speed at the start point of the returning operation time or the end point of the returning operation time is larger than or equal to a third predetermined value, and v) a peak point at which the absolute value of the returning operation speed is the maximum value is located within a predetermined period that includes a median point between the start point of the returning operation time and the end point of the returning operation time.

7. The steering system according to claim 1, wherein the steering control device is configured to change the returning operation time on the basis of an allowable range of a target return position of the steering member in the returning operation assist control with respect to the neutral position of the steering member.

8. The steering system according to claim 1, wherein the steering control device is configured to change the returning operation time on the basis of a turning operation time of the turning operation.

9. The steering system according to claim 1, wherein the steering control device is configured to change the returning operation time on the basis of a vehicle speed of the vehicle.

10. The steering system according to claim 1, wherein the steering control device is configured to change the returning operation time on the basis of a running state of the vehicle.

11. A steering control device comprising:
a control unit configured to execute returning operation assist control in which an actuator that assists a steering operation of a steering member provided on a vehicle and used for the steering operation is controlled to assist a returning operation for returning the steering member to a neutral position, the returning operation corresponding to a turning operation for turning the steering member from the neutral position; and
an operation time calculation unit configured to determine a returning operation time at the time of executing the returning operation assist control on the basis of a steering operation amount of the steering member at the time of the turning operation.

12. The steering system according to claim 1, wherein the steering operation amount is a steering angle.

13. The steering system according to claim 1, wherein the returning operation time is determined by an equation:

$$t \approx \log(D/W),$$

wherein t is the operation time, D is an operation distance, and W is an allowable range of deviation with respect to a final position and an arrival time required to reach an end point.

* * * * *